US012731893B2

(12) United States Patent
Scarborough et al.

(10) Patent No.: US 12,731,893 B2
(45) Date of Patent: Sep. 8, 2026

(54) LENS ANTENNA SYSTEM

(71) Applicant: All.Space Networks Limited, Reading (GB)

(72) Inventors: Clinton P. Scarborough, Darlington, MD (US); Jeremiah P. Turpin, Linthicum, MD (US); Daniel F. DiFonzo, Rockville, MD (US); John Finney, London (GB)

(73) Assignee: All.Space Networks Limited, Reading (GB)

( * ) Notice: Subject to any disclaimer, the term of this patent is extended or adjusted under 35 U.S.C. 154(b) by 0 days.

(21) Appl. No.: 18/498,013

(22) Filed: Oct. 30, 2023

(65) Prior Publication Data

US 2024/0079776 A1 Mar. 7, 2024

Related U.S. Application Data

(63) Continuation of application No. 16/726,342, filed on Dec. 24, 2019, which is a continuation of application (Continued)

(51) Int. Cl.

| | |
|---|---|
| ***H01Q 3/46*** | (2006.01) |
| ***H01Q 1/28*** | (2006.01) |
| ***H01Q 3/14*** | (2006.01) |
| ***H01Q 3/24*** | (2006.01) |
| ***H01Q 3/30*** | (2006.01) |
| ***H01Q 19/06*** | (2006.01) |
| ***H01Q 21/00*** | (2006.01) |

(Continued)

(52) U.S. Cl.

CPC ............... *H01Q 3/46* (2013.01); *H01Q 1/288* (2013.01); *H01Q 3/14* (2013.01); *H01Q 3/245* (2013.01); *H01Q 3/30* (2013.01); *H01Q 19/062* (2013.01); *H01Q 21/0025* (2013.01); *H01Q 21/061* (2013.01); *H01Q 21/22* (2013.01); *H01Q 25/007* (2013.01); *H01Q 1/241* (2013.01)

(58) Field of Classification Search

CPC .................................. H01Q 3/14; H01Q 3/46

See application file for complete search history.

(56) References Cited

U.S. PATENT DOCUMENTS 4,071,848 A 1/1978 Leeper
4,332,018 A 5/1982 Sternberg et al.

(Continued)

FOREIGN PATENT DOCUMENTS

JP H09-8534 A 1/1997
JP 2000-022423 A 1/2000

(Continued)

OTHER PUBLICATIONS

"Antenna Frequency Scaling," The ARRL Antenna Book, 1988, pp. 2-24 to 2-25. (Year: 1988).*

(Continued)

*Primary Examiner* — Graham P Smith
(74) *Attorney, Agent, or Firm* — Wolf, Greenfield & Sacks, P.C.

(57) ABSTRACT

An antenna system that includes a plurality of lens sets. Each lens set includes a lens and at least one feed element. At least one feed element is aligned with the lens and configured to direct a signal through the lens at a desired direction.

19 Claims, 18 Drawing Sheets

Related U.S. Application Data

No. 16/173,985, filed on Oct. 29, 2018, now Pat. No. 10,553,947, which is a continuation of application No. 15/722,561, filed on Oct. 2, 2017, now Pat. No. 10,116,051.

(60) Provisional application No. 62/472,991, filed on Mar. 17, 2017.

(51) Int. Cl.

| | |
|---|---|
| ***H01Q 21/06*** | (2006.01) |
| ***H01Q 21/22*** | (2006.01) |
| ***H01Q 25/00*** | (2006.01) |
| *H01Q 1/24* | (2006.01) |

(56) References Cited

U.S. PATENT DOCUMENTS

| | | | | |
|---|---|---|---|---|
| 4,499,473 | A * | 2/1985 | Rao | H01Q 1/421 343/756 |
| 4,845,507 | A | 7/1989 | Archer et al. | |
| 5,283,587 | A | 2/1994 | Hirshfield et al. | |
| 5,436,453 | A | 7/1995 | Chang et al. | |
| 5,457,465 | A | 10/1995 | Collier et al. | |
| 5,821,908 | A | 10/1998 | Sreenivas | |
| 5,856,804 | A | 1/1999 | Turcotte et al. | |
| 6,133,887 | A | 10/2000 | Tanizaki et al. | |
| 6,188,360 | B1 * | 2/2001 | Kato | H01P 7/10 343/846 |
| 7,605,768 | B2 | 10/2009 | Ebling et al. | |
| 8,518,537 | B2 | 8/2013 | Mattisine | |
| 9,728,860 | B2 | 8/2017 | Mattisine et al. | |
| 10,116,051 | B2 | 10/2018 | Scarborough et al. | |
| 10,211,540 | B2 | 2/2019 | Roitberg et al. | |
| 10,256,537 | B2 | 4/2019 | Besoli et al. | |
| 10,553,943 | B2 | 2/2020 | Tran | |
| 10,553,947 | B2 | 2/2020 | Scarborough et al. | |
| 10,693,210 | B2 | 6/2020 | Chattopadhyay et al. | |
| 10,959,110 | B2 | 3/2021 | Linehan | |
| 2005/0116871 | A1 * | 6/2005 | Moheb | H01Q 13/0258 343/772 |
| 2006/0211451 | A1 * | 9/2006 | Pak | H02G 3/123 455/561 |
| 2007/0001918 | A1 | 1/2007 | Ebling et al. | |
| 2008/0238795 | A1 | 10/2008 | Alamouti et al. | |
| 2014/0077995 | A1 | 3/2014 | Artemenko et al. | |
| 2016/0172767 | A1 | 6/2016 | Ray | |
| 2017/0040705 | A1 | 2/2017 | Matitsine et al. | |
| 2017/0040706 | A1 | 2/2017 | Matitsine et al. | |
| 2017/0062944 | A1 | 3/2017 | Zimmerman et al. | |
| 2018/0269576 | A1 | 9/2018 | Scarborough et al. | |
| 2019/0074588 | A1 | 3/2019 | Scarborough et al. | |
| 2020/0144719 | A1 | 5/2020 | Scarborough et al. | |

FOREIGN PATENT DOCUMENTS

| | | | |
|---|---|---|---|
| JP | 2000-196345 | A | 7/2000 |
| WO | WO 2010/016799 | A1 | 2/2010 |
| WO | WO 2018/048520 | A1 | 3/2018 |
| WO | WO 2018/132511 | A1 | 7/2018 |

OTHER PUBLICATIONS

"Arrays: Linear Planar and Circular," Antenna Theory Analysis and Design, 3rd Edition, Constantine Balanis, 2005, pp. 283 to 371. (Year: 2005).*

"Arrays: Linear Planar and Circular," Antenna Theory Analysis and Design, 3rd Edition, Constantine Balanis, 2005, pp. 283-371.*

Final Written Decision. Inter Partes Review. *Masting, Inv.* v. *Isotropic Systems, Inc.* IPR Case No. IPR2022-01108/ U.S. Pat. No. 10,533,947B2. Entered Dec. 7, 2023, 105 pages.

Afanasyev et al., Multi-beam Luneburg Lens Antenna for Cellular Communications. 9th European Conference on Antennas and Propagation (EuCAP). Lisbon. 2015. 4 Pages.

Bor et al., Foam Based Luneburg Lens Antenna at 60GHz. Progress In Electromagnetics Research Letters.2014;44:1-7.

Bor et al., Light and Cheap flat foam-based Luneburg Lens Antenna. 8th European Conference on Antennas and Propagation (EuCAP). 2014 5 Pages.

Decision Granting Institution of Inter Partes Review. *Masting, Inv.* v. *Isotropic Systems, Inc.* IPR Case No. IPR2022-01108/ U.S. Pat. No. 10,533,947B2. Dec. 14, 2022.

Declaration of Anthony Teillet in support of Petitioner's Reply to Patent Owner's Response. *Masting, Inv.* v. *Isotropic Systems, Inc.* IPR Case No. IPR2022-01108/ U.S. Pat. No. 10,533,947B2. May 31, 2023.

Declaration of Anthony Teillet. *Masting, Inv.* v. *Isotropic Systems, Inc.* IPR Case No. IPR2022-01108/ U.S. Pat. No. 10,533,947B2. May 26, 2022.

Declaration of Gabriel M. Rebeiz. *Masting, Inv.* v. *Isotropic Systems, Inc.* IPR Case No. IPR2022-01108/ U.S. Pat. No. 10,533,947B2. Sep. 12, 2022.

Declaration of Nader Behdad, PhD. *Masting, Inv.* v. *Isotropic Systems, Inc.* IPR Case No. IPR2022-01108/ U.S. Pat. No. 10,533,947B2. Mar. 8, 2023.

Demetriadou et al., Slim Luneburg lens for antenna applications. Optics Express. Oct. 10, 2011;19(21):19925-34.

Deposition of Nader Behdad. *Masting, Inv.* v. *Isotropic Systems, Inc.* IPR Case No. IPR2022-01108/ U.S. Pat. No. 10,533,947B2. Apr. 20, 2023.

Dixon, "A Broadband, High-Gain, Steerable Luneburg Lens," In-Building Wireless Antennas. Applied Microwave & Wireless.Jan. 2002;14:66-70.

Elsherbiny, et al., Holographic Antenna Concept, Analysis, and Parameters. IEEE Transactions on Antennas and Propagation, vol. 52. No. 3, Mar. 2004, pp. 830-839.

Evans, Simple forms for equations of rays in gradient-index lenses. American Journal of Physics. 1990;58:773-78. 10.1119/1.16357.

Extended European Search Report dated Apr. 20, 2018, in connection with European Application No. 17196795.3.

Fuchs et al., Design Optimization of Multishell Luneburg Lenses. IEEE Transactions on Antennas and Propagation. Feb. 2007.55(2):283-89.

Gregory et al., Fast Optimization of Electromagnetic Design Problems Using the Covariance Matrix Adaptation Evolutionary Strategy. IEEE Transactions on Antennas and Propagation. Apr. 2011;59(4):1275-85. doi: 10.1109/TAP.2011.2109350.

Gregory, et al., Exploiting Rotational Symmetry for the Design of Ultra-Wideband Planar Phased Array Layouts. IEEE Transactions on Antennas and Propagation, vol. 61, No. 1, Jan. 2013, pp. 176-184.

Hadka et al., Borg: An Auto-Adaptive Many-Objective Evolutionary Computing Framework. Evolutionary Computation. 2013;21(2):231-59.

International Search Report and Written Opinion mailed Dec. 17, 2019, in connection with International Application No. PCT/IB2019/057947.

International Search Report and Written Opinion mailed May 3, 2018, in connection with International Application No. PCT/IB2018/051752.

Japanese Office Action dated Jan. 29, 2019, for JP Application No. 2017-233638.

Kot et al., A Spherial Lens for the SKA. Experimental Astronomy. An International Journal on Astronomical Instrumentation and Data Analysis. 2004;17(1-3):141-48.

Kwon et al., Transformation optical designs for wave collimators, flat lenses and right-angle bends. New Journal of Physics. 2008 Nov. 27;10(11). 13 Pages.

Lee et al., Antenna Handbook. Theory, Applications and Design. 1988. Springer Science. 8 Pages. DOI: 10.1007/978-1-4615-6459-1.

Li, et al., Beam Scanning Array Based on Luneburg Lens. IEEE, 2014, pp. 1274-1275.

Li, et al., Luneburg Lens with Extended Flat Focal Surface for Electronic Scan Applications. Optics Express, vol. 24, No. 7, Mar. 25, 2016; 11 pages.

(56) References Cited

OTHER PUBLICATIONS

Liang et al., A 3-D Luneburg Lens Antenna Fabricated by Polymer Jetting Rapid Prototyping. IEEE Transactions on Antennas and Propagation. Apr. 4, 2014;62(4):1799-1807.
Mateo-Segura et al., Flat Luneburg Lens via Transformation Optics for Directive Antenna Applications. IEEE Transactions on Antennas and Propagation, vol. 62, No. 4, Apr. 2014, pp. 1945-1953.
Matytsine et al., Large Size, Lightweight, Luneburg Lenses for Multi-beam Antenna Applications. 6th European Conference on Antennas and Propagation (EUCAP).2012.38 Pages.
Merchand. Gradient Index Optics. Elsevier. 2012.
Moore et al., Multiobjective particle swarm optimization. Proceedings of the 38$^{th}$ annual on Southeast regional conference. ACM. 2000. pp. 56-57.
Morgan et al., Transformation-optics-inspired anti-reflective coating design for gradient index lenses. Opt Lett. Jun. 1, 2015;40(11):2521-4. doi: 10.1364/OL.40.002521.
Mosallaei. Nonuniform Luneburg and Two-Shell Lens Antennas: Radiation Characteristics and Design Optimization. IEEE Transactions on Antennas an Propagation. Jan. 2021;49(1):60-9.
Napier, et al., The Very Large Array: Design and Performance of a Modern Synthesis Radio Telescope. Proceedings of the IEEE, vol. 71, No. 11, Nov. 1983, pp. 1295-1300.
Notice of Filing Patent Owner's Demonstratives. *Matsing, Inc.* v. *All.Space Networks, Ltd. f/k/a Isotropic Systems, Ltd.* IPR Case No. IPR2022-01108/ U.S. Pat. No. 10,533,947B2. Sep. 11, 2023.
Notice of Petitioner's Demonstratives. *Masting, Inv.* v. *Isotropic Systems, Inc.* IPR Case No. IPR2022-01108/ U.S. Pat. No. 10,533,947B2. Sep. 11, 2023.
Notification on The Results of Examination of Patentability of Invention, issued in RU Application No. 2019126577/28 dated Feb. 2, 2022.
Patent Owner Preliminary Response to Petition for Inter Partes Review. *Masting, Inv.* v. *Isotropic Systems, Inc.* IPR Case No. IPR2022-01108/ U.S. Pat. No. 10,533,947B2. Sep. 20, 2022.
Patent Owner's Demonstrative Exhibits. *Matsing, Inc.* v. *All.Space Networks, Ltd. f/k/a Isotropic Systems, Ltd.* IPR Case No. IPR2022-01108/ U.S. Pat. No. 10,533,947B2. Sep. 8, 2023.
Patent Owner's Objections to Evidence. *Masting, Inv.* v. *Isotropic Systems, Inc.* IPR Case No. IPR2022-01108/ U.S. Pat. No. 10,533,947B2. Dec. 29, 2022.
Patent Owner's Response. *Masting, Inv.* v. *Isotropic Systems, Inc.* IPR Case No. IPR2022-01108/ U.S. Pat. No. 10,533,947B2. Mar. 8, 2023.
Patent Owner's Sur-Reply. *Masting, Inv.* v. *Isotropic Systems, Inc.* IPR Case No. IPR2022-01108/ U.S. Pat. No. 10,533,947B2. Jul. 12, 2023.
Pendry et al., Controlling electromagnetic fields. Science. Jun. 23, 2006;312(5781):1780-2. DOI: 10.1126/science.1125907. Epub 200 May 25.
Petition for Inter Partes Review. *Matsing, Inc.* v. *All.Space Networks, Ltd. f/k/a Isotropic Systems, Ltd.* IPR Case No. IPR2022-01108/ U.S. Pat. No. 10,533,947B2. Oct. 23, 2023.
Petitioner's Reply to Patent Owner's Response. *Masting, Inv.* v. *Isotropic Systems, Inc.* IPR Case No. IPR2022-01108/ U.S. Pat. No. 10,533,947B2. May 31, 2023.
Petitioner's Demonstratives. *Matsing, Inc.* v. *All.Space Networks, Ltd. f/k/a Isotropic Systems, Ltd.* IPR Case No. IPR2022-01108/ U.S. Pat. No. 10,533,947B2. Sep. 11, 2023.
Rahmat-Samii, Genetic Algorithm (GA) and Particle Swarm Optimization (PSO) in Engineering Eletromagnetics. IEEE Applied Electromagnetics and Communications. Oct. 1-3, 2003. 5 Pages.
Remote Deposition of Anthony Teillet. *Masting, Inv.* v. *Isotropic Systems, Inc.* IPR Case No. IPR2022-01108/ U.S. Pat. No. 10,533,947B2. Jun. 29, 2023.
Rondineau et al., A Sliced Spherial Luneburg Lens. IEEE Antennas and Wireless Propagation Letters. 2003;2:163-66.
U.S. Appl. No. 62/438,181. Method and Design for a Compact, Flat, Microwave Lens with Wide Angular Field of Regard and Wideband Operation, filed Dec. 22, 2016.
Virtual Deposition of Anthony Teillet. *Masting, Inv.* v. *Isotropic Systems, Inc.* IPR Case No. IPR2022-01108/ U.S. Pat. No. 10,533,947B2. Feb. 16, 2023.
Vo H, Development of an Ultra-Wideband Low-Profile Wide Scan Angle Phased Array Antenna. Dissertation. Ohio State University, 2015, 112 pages.
Weile et al., Genetic Algorithm Optimization Applied to Electromagnetics: A Review. IEEE Transactions on Antennas and Propagation. Mar. 1997;45(3). 11 Pages.

* cited by examiner

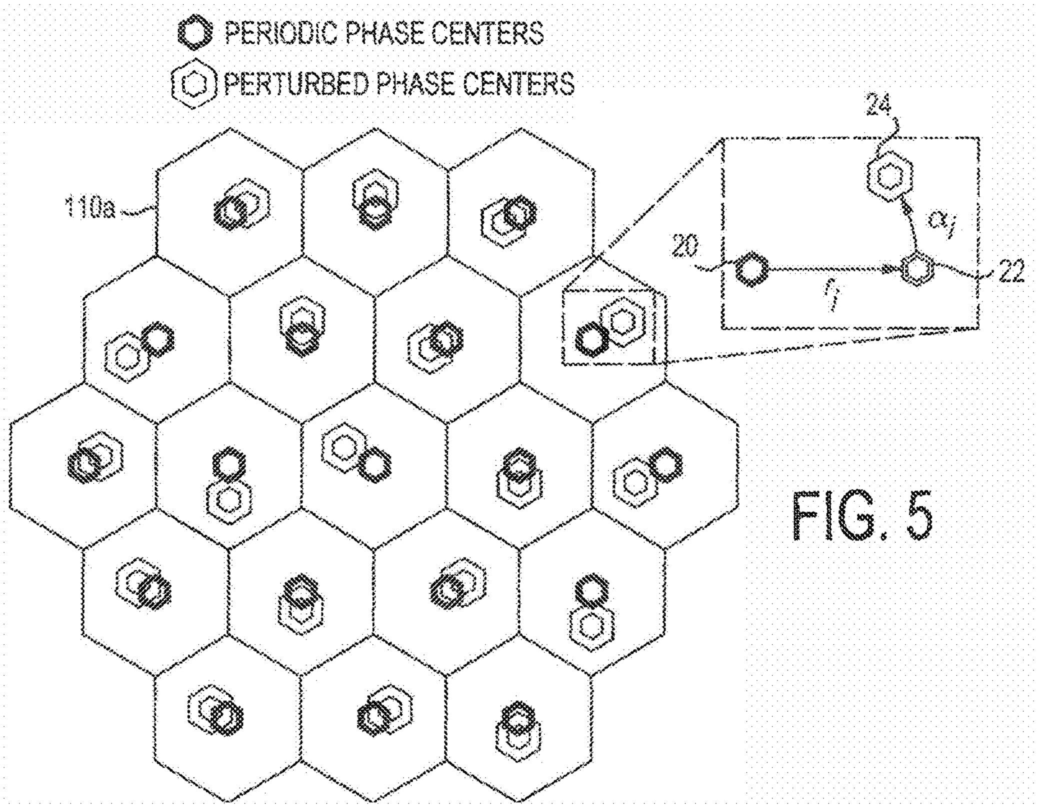
FIG. 5
FIG. 6a
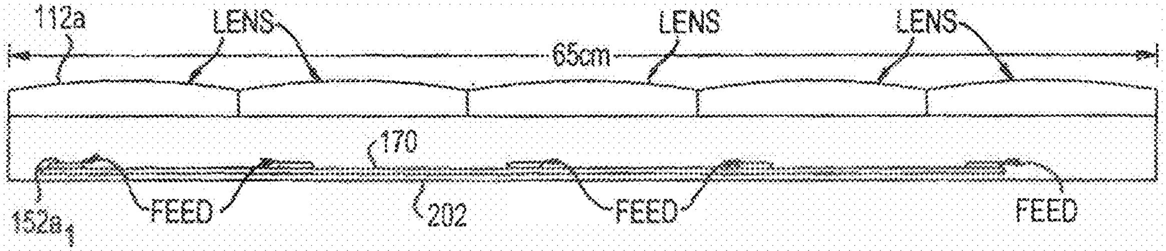
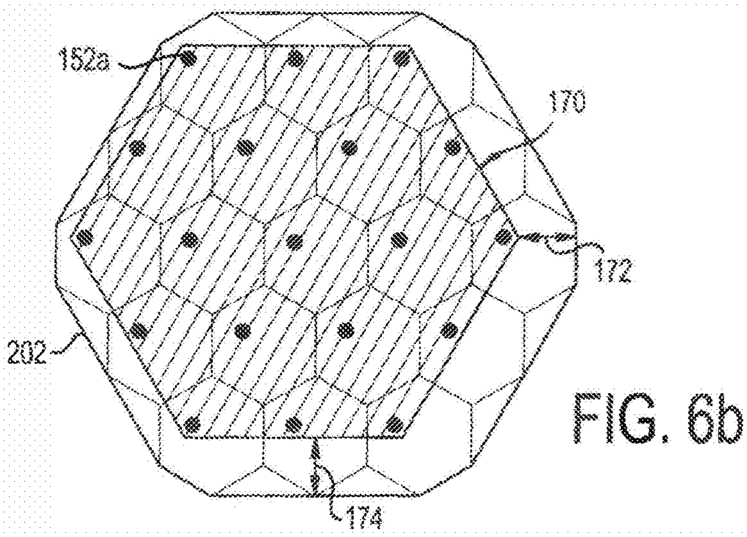
FIG. 6b

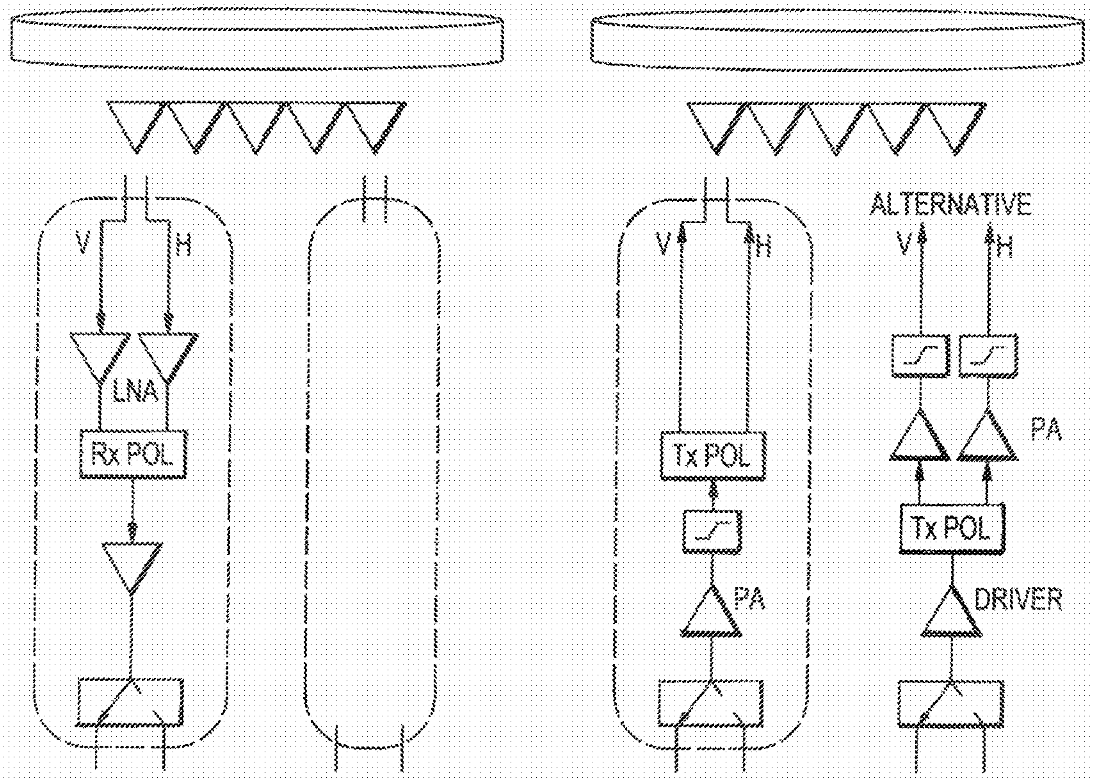
FIG. 9a
FIG. 9b
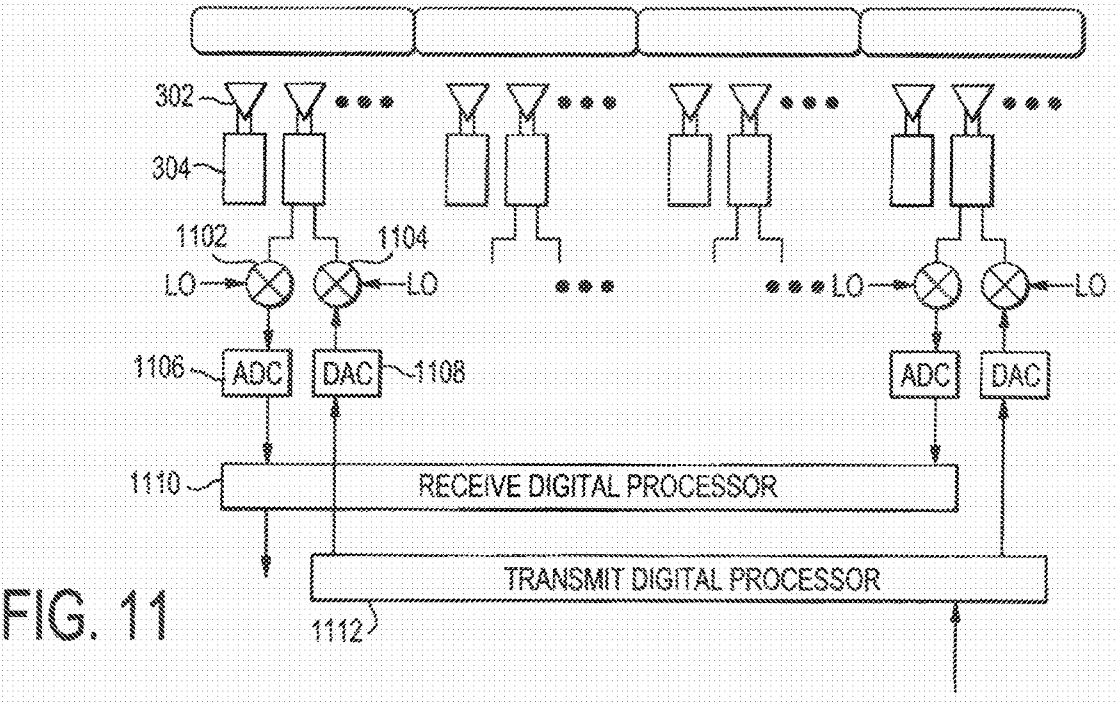
FIG. 11

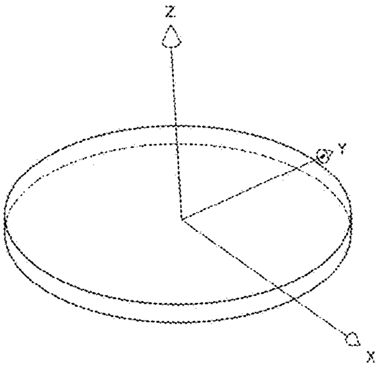
Figure 15(a)
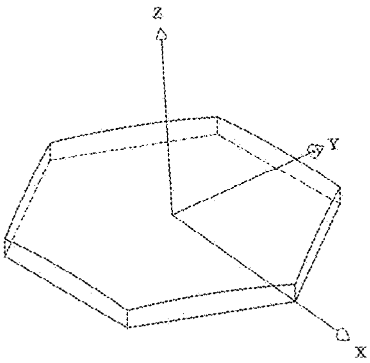
Figure 15(b)
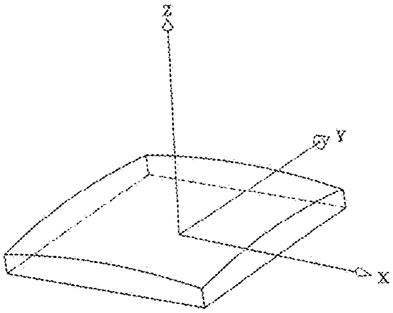
Figure 15(c)
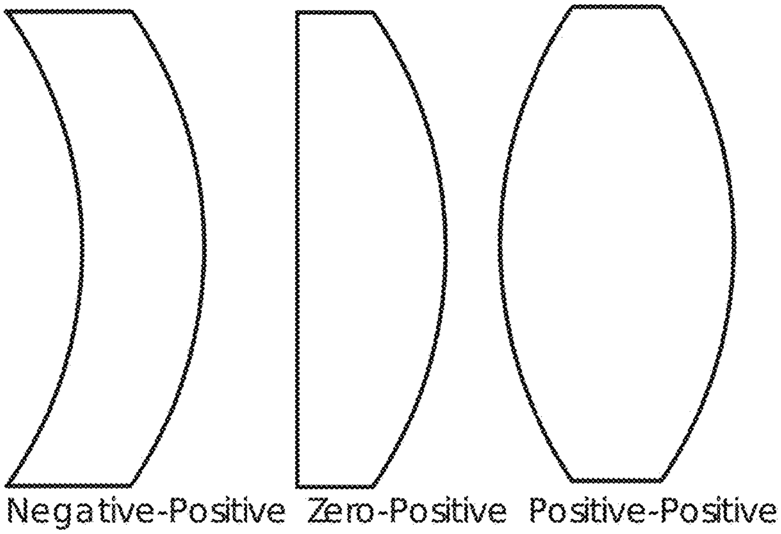
Figure 16(a)
Figure 16(b)
Figure 16(c)

Optimization Data Flow Diagram

General-purpose Computer Implementation of Design Process

LENS ANTENNA SYSTEM

RELATED APPLICATIONS

This application is a continuation of U.S. application Ser. No. 16/726,342, filed Dec. 24, 2019, which is a continuation of U.S. application Ser. No. 16/173,985, filed on Oct. 29, 2018, which is a continuation of U.S. application Ser. No. 15/722,561, filed on Oct. 2, 2017, U.S. Pat. No. 10,116,051, which claims the benefit of U.S. Provisional Application No. 62/472,991, filed Mar. 17, 2017. The entire contents of each of the foregoing applications is incorporated herein by reference.

BACKGROUND OF THE INVENTION

Field of the Invention

The present invention relates to a multiple beam phased array antenna system. More particularly, the present invention relates to a broadband wide-angle multiple beam phased array antenna system with reduced number of components using wide-angle gradient index lenses each with multiple scannable beams.

Background of the Related Art

Phased arrays are a form of aperture antenna for electromagnetic waves that can be constructed to be low-profile, relatively lightweight, and can steer the resulting high-directivity beam of radio energy to point in a desired direction with electrical controls and no moving parts. A conventional phased array is a collection of closely-spaced (half-wavelength) individual radiating antennas or elements, where the same input signal is provided to each independent radiating element subject to a specified amplitude and a time or phase offset. The energy emitted from each of the radiating elements will then add constructively in a direction (or directions) determined by the time/phase offset configuration for each element. The individual antennas or radiating elements for such a phased array are designed such that the radiated energy angular distribution or pattern from each feed in the array mutual coupling environment, sometimes called the embedded element or scan element gain pattern, is distributed as uniformly as possible, subject to the physical limitations of the projected array aperture over a wide range of spatial angles, to enable the maximum antenna gain over the beam scanning angles. Examples of conventional phased arrays are described in U.S. Pat. Nos. 4,845,507, 5,283,587, and 5,457,465.

In comparison to other common methods of achieving high directivity radio beams, such as reflector antennas (parabolic or otherwise) and waveguide-based horn antennas, phased arrays offer many benefits. However, the cost and power consumption of an active phased array, namely one incorporating amplifiers at the elements for the reception and/or transmission functions, are proportional to the number of active feeds in the array. Accordingly, large, high-directivity phased arrays consume relatively large amounts of power and are very expensive to manufacture.

Phased arrays typically require that the entire aperture is filled with closely-spaced feeds to preserve performance over the beam steering range when using conventional approaches. Densely packing feeds (spaced approximately half of a wavelength at highest frequency of operation) is required to preserve aperture efficiency and eliminate grating lobes. Broadband phased arrays are constrained by the element spacing, aperture filling fraction requirements, and the types of circuits used for phase or time offset control, in addition to the bandwidth limitations of the radiating elements and the circuitry.

For example, an approximately square 65 cm 14.5 GHz Ku-band phased array that is required to steer its beam to about 70 degrees from the array normal or boresight would require more than 4000 elements, each with independent transmit (Tx)-and/or receive (Rx) modules, phase shifters or time delay circuits, and additional circuitry. All the elements must be powered whenever the terminal is operating, which introduces a substantial steady-state DC current requirement.

Every element or feed in an active phased array must be enabled for the array to operate, resulting in high power drain, e.g., 800 W or more for a 4000-element array, depending on the efficiency of the active modules. There is no ability to disable certain elements to reduce power consumption without dramatically impacting the array performance.

Various techniques have been developed in support of sparse arrays, where the element spacings can be as large as several wavelengths. Periodic arrays with large element spacings yield grating lobes, but appropriately choosing randomized locations for the elements breaks up the periodicity and can reduce the grating lobes. These arrays have found limited use, however, as the sparse nature of the elements leads to a reduced aperture efficiency, requiring a larger array footprint than is often desired. See Gregory, M. D., Namin, F. A. and Werner, D. H., 2013. "Exploiting rotational symmetry for the design of ultra-wideband planar phased array layouts." IEEE Transactions on Antennas and Propagation, 61(1), pp. 176-184, which is hereby incorporated by reference.

Another way to limit the effect of grating lobes is by using highly-directivity array elements, because the total array pattern is the product of the array factor, i.e. the pattern of an array of isotropic elements, and the element gain pattern. If the element pattern is very directive, this product suppresses most of the grating lobes outside the main beam region. An example is the Very Large Array (VLA). The VLA consists of many large, gimballed reflector antennas forming a very sparse array of highly directive elements (the reflectors), each with a narrow element pencil beam which dramatically reduces the magnitude of the sidelobes in the total radiation pattern from the array. See P. J. Napier, A. R. Thompson and R. D. Ekers, "The very large array: Design and performance of a modern synthesis radio telescope." Proceedings of the IEEE, vol. 71, no. 11, pp. 1295-1320, November 1983; and www.vla.nrao.edu/, which is hereby incorporated by reference.

SUMMARY OF THE INVENTION

The invention provides a family of phased array antennas constructed from a relatively small number of elements and components compared with a conventional phased array. The array uses a relatively small number of radiating elements, each of which is a relatively electrically large, e.g., 5 wavelengths, GRadient INdex (GRIN) lens, specially optimized, with at least one or multiple feed elements in its focal region. Each array element comprises the GRIN lens and one or more feed elements in the focal region of each lens. The lens-feeds set may have one or more beams whose element pattern directions may be varied or controlled to span the desired beam steering range or field of regard. In the case of one feed or cluster of feeds excited to operate as a single effective feed, the position of the feed or cluster may be physically moved relative to the focal point of the lens to effect beam steering. In the case of beam steering with no moving parts, a set of multiple feeds may be placed in the focal region of each lens and the selection (e.g. by switching) of the active feed or feed cluster produces an element beam that is directed to a specific beam direction. The specific structure of the GRIN lens can be optimized in a suitable manner, such as in accordance with the invention disclosed in Applicant's U.S. Provisional Application No. 62/438,181, filed Dec. 22, 2016, the entire contents of which are hereby incorporated by reference.

In one embodiment, the array would steer one or more beams over a specified angular range or field of regard with no moving parts by having multiple feeds in the focal region of each lens and selecting the active feed to steer the element beam. In another highly-simplified embodiment an array with minimal parts count could also be implemented by physically moving each feed element in the corresponding lens's focal region. In this simplified embodiment, the set of feed elements across the entire array could be moved together, such that only two actuators ganged across all the lenses are required, or with independent actuators for each lens for improved control. The overall array pattern is obtained by an antenna circuit and/or antenna processing device, which may combine the corresponding active feed elements at each lens with phase/time delay circuits and an active or passive corporate feed network.

The beam scanning performance of the array is controlled at two levels: coarse beam pointing and fine beam pointing. The coarse beam pointing of each lens is obtained by selecting a specific feed or small cluster of feeds excited to act as a single feed (or feed location) in the focal region of each lens. The lens and feed combination produces a directive but relatively broad beam consistent with the lens size in wavelengths and in a direction dependent on the displacement of the feed from the lens nominal focal point. By combining the corresponding feed elements in each lens of the array with appropriate phase shifts or time delays, fine control of beam pointing and high directivity due to the overall array aperture size is obtained. The set of feeds in the focal region of each lens for full electronic beam steering occupies only a fraction of the area associated with each lens so that the number of feeds and components is much lower compared with a conventional phased array. Furthermore, it is evident that, since power need be applied only to the active feeds, the power consumption of this array is substantially less than for a conventional phased array, which must have all its elements supplied with power. This specialized phased array design substantially reduces the total component count, cost, and power consumption compared with a conventional phased array with equivalent aperture size while maintaining comparable technical performance.

Furthermore, each lens and its multiple feed elements can form multiple beams simply by enabling and exciting separate feed elements in each lens with independent RF signals. Thus, the technology can be used with associated electronics for beam pointing control, and hardware and software interfaces with receive and transmit subsystems, allowing simultaneous one-way or two-way communications with one or more satellites or other remote communication nodes. The multiple beam capability along with reduced parts count and lower power consumption compared with a conventional phased array is particularly valuable in applications where it is desired to communicate with more than one satellite or, for example, to enable a "make-before-break" connection to non-geostationary satellites as they pass over the terminal.

The relatively small number of components and the flexibility afforded by having the element patterns be directive and capable of being steered over a wide range of angles offers substantial cost savings. The individually scanning antenna elements (e.g., lenses) allow for wide field of regard and, even though grating lobes exist due to the large element spacing, the degrees of freedom afforded by optimizing the element positions and orientations and the beam directions and directivity of the elements allows minimizing magnitudes of the grating lobes in the radiation pattern(s) of the array.

The array of lenses is not a sparse array, as the lenses fill the aperture area of the array. The phase center of each lens may be offset slightly, which thus breaks up the periodicity of the entire array and reduces grating lobes while having relatively low impact on efficiency, in addition to the reductions afforded by the steerable element patterns.

The new phased array antenna system has an array of electrically-large, high-gain antenna elements, each element comprising a microwave lens which may be a gradient index (GRIN) lens with one or more feeds in its focal region. Each lens and feed subsystem can form multiple independent element patterns whose beams are steered according to the displacement of the feeds from the nominal lens focal point. Further, by combining and phasing the corresponding ports of a multiplicity of such lens and feed subsystems a high gain beam is formed with finely controlled beam direction. In this way, the antenna beam is scanned by first steering the element patterns for coarse pointing (via the lens set circuitry), and then fine-pointing the array beam using the relative phase or time delays to each feed (via the antenna circuitry). The antenna circuitry may use digital beam forming techniques where the signals to and from each feed are processed using a digital signal processor, analog-to-digital conversion, and digital-to-analog conversion. The electrically large element apertures are shaped and tiled to fill the overall array aperture for high aperture efficiency and gain. Furthermore, the array need not be planar but the lens/feed subsystems may be arranged on curved surfaces to be conformal to a desired shape such as for aircraft. The scanning, high-directivity elements require fewer active components compared with a conventional phased array, thereby yielding substantial cost and power savings. Furthermore, the array of lenses may be placed to form arrays of arbitrary form factors such as symmetrical or elongated arrays.

Furthermore, each lens can form simultaneous multiple beams by activating the appropriate feed elements. These feed elements may be combined with their own phasing or time delay networks or even with digital beam forming circuitry to form multiple high gain beams from the overall array. Design flexibility inherent in the extra degrees of freedom afforded by the lens and feed combinations along with the lens orientations and positions allows for grating lobe suppression as well as a broad field of view. The antenna system may be part of a communications terminal that includes acquisition and tracking subsystems that produce single or multiple beams covering a broad field of regard for such applications as satellite communications (Satcom) on-the-move (SOTM), 5G, broadband point-point or point-multipoint and other terrestrial or satellite communications systems. The antenna design with such lens naturally supports multiple simultaneous independently steerable beams. These simultaneous beams may be used for many applications such as: sensors for surveillance; reception of multiple transmission sources; multiple transmission beams; "make-before-break" links with non-geostationary, e.g., low earth orbit (LEO) or medium earth orbit (MEO) satellite constellations; and null placement for interference reduction without incurring the high cost of a conventional multi-beam phased array. Furthermore, the phased array antenna system can be used on spacecraft for single or multiple beam or shaped beam satellite applications.

These and other objects of the invention, as well as many of the intended advantages thereof, will become more readily apparent when reference is made to the following description, taken in conjunction with the accompanying drawings.

In addition to Phased Array incarnations, MIMO (multi-input multi-output) communication systems could also make use of the capability provided by a collection lenses and associated circuitry. Although the signal processing is different for a MIMO compared to a conventional phased array, both can make use of steered beams to enhance signal strength and improve communications in a noisy or interferer-filled environment.

BRIEF DESCRIPTION OF THE FIGURES

FIG. 5 is a top view of perturbed element phase centers for grating lobe control;

FIG. 6(*a*) is a side view of simplified beam steering by mechanically shifting the positions of a single feed element within each lens;

FIG. 6(*b*) is a top view of simplified beam steering of FIG. 6(*a*);

FIG. 9(*a*) is a block diagram for a receive-only circuit for the lens feed;

FIG. 9(*b*) is a block diagram for a transmit-only circuit for the lens feed;

FIG. 11 is a functional block diagram for circuit implementation in the digital domain for digital beam processing;

FIG. 15 illustrates lenses showing different side boundary profiles: circular (a), hexagonal (b) and square (c).

FIG. 16 illustrates example geometries for a lens with high aperture efficiency and wide field of regard.

DETAILED DESCRIPTION OF THE PREFERRED EMBODIMENTS

Figure 1:
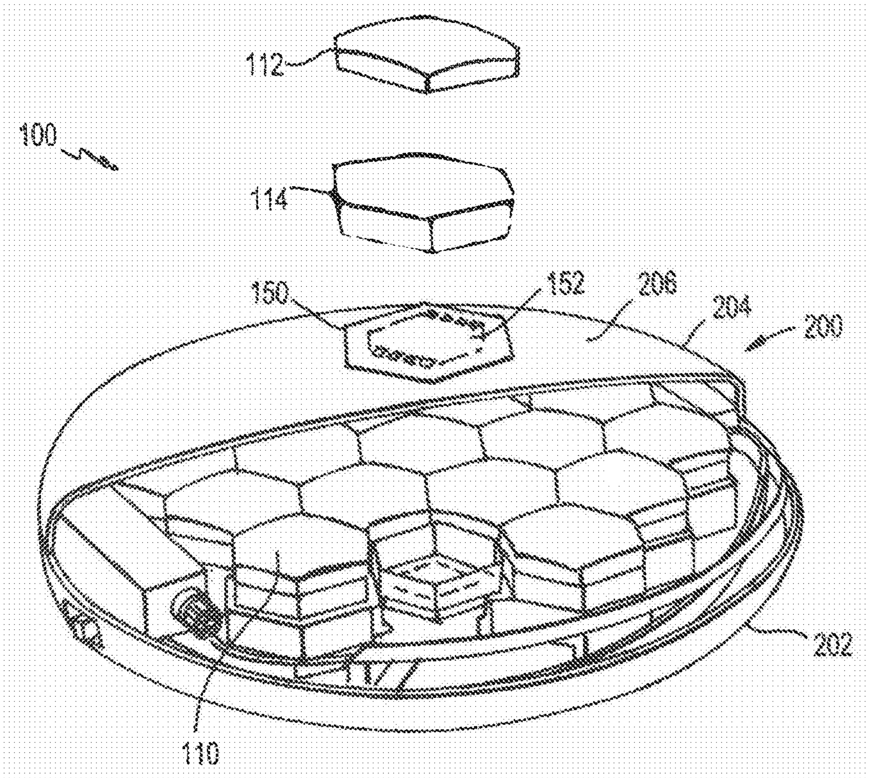
FIG. 1 is a cutaway perspective view of a multiple-beam phased array with electrically large multi-beam elements.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, FIG. 1 shows a lens array 100. The lens array 100 has a plurality of lens sets 110. Each lens set 110 includes a lens 112, spacer 114 and feed set 150 which has multiple feed elements 152, as shown by the one exploded lens set 110 for purposes of illustration. The spacer 114 separates the lens 112 from the feed set 150 to match the appropriate focal length of the lens. The spacer 114 may be made out of a dielectric foam with a low dielectric constant. In other examples, the spacer 114 includes a support structure that creates a gap, such as an air gap, between the lens 112 and the feed set 150. In further examples, the lens set 110 does not include the spacer 114. The feed element 152 may be constructed as a planar microstrip antenna, such as a single or multilayer patch, slot, or dipole, or as a waveguide or aperture antenna. While depicted as a rectangular patch on a multilayer printed-circuit board (PCB), the feed element 152 may have an alternate configuration (size and/or shape).

The PCB forming the base of the feed set 150 within each lens set further includes signal processing and control circuitry ("lens set circuit"). The feed elements 152 may be identical throughout the feed set 150, or individual feeds 152 within the feed set 150 may be independently designed to optimize their performance based on their location beneath the lens 112. The physical arrangement of the feed elements 152 within the feed set 150 may be uniform on a hexagonal or rectilinear grid, or may be nonuniform, such as on a circular or other grid to optimize the cost and radiation efficiency of the lens array 100 as a whole. The feed elements 152 themselves may be any suitable type of feed element. For example, the feed elements 152 may correspond to printed circuit "patch-type" elements, air-filled or dielectric loaded horn or open-ended waveguides, dipoles, tightly-coupled dipole array (TCDA) (see Vo, Henry "DEVELOPMENT OF AN ULTRA-WIDEBAND LOW- PROFILE WIDE SCAN ANGLE PHASED ARRAY ANTENNA." Dissertation. Ohio State University, 2015), holographic aperture antennas (see M. ElSherbiny, A. E. Fathy, A. Rosen, G. Ayers, S. M. Perlow, "Holographic antenna concept, analysis, and parameters", IEEE Transactions on Antennas and Propagation, Volume 52 issue 3, pp. 830-839, 2004), other wavelength scale antennas, or a combination thereof. In some implementations, the feed elements 152 each have a directed non-hemispherical embedded radiation pattern.

Signals received by the lens array 100 enter each lens set 110 through the respective lens 112, which focuses the signal on one or more of the feed elements 152 of the feed set 150 for that lens set 110. The signal incident to a feed element is then passed to signal processing circuitry (lens set circuitry, followed by the antenna circuitry), which is described below. Likewise, signals transmitted by the lens array 100 are transmitted from a specific feed set 150 out through the respective lens 112.

The number of electrical and radio-frequency components (e.g., amplifiers, transistors, filters, switches, etc.) used in the lens array 100 is proportional to the total number of feed elements 152 in the feed sets 150. For example, there can be one component for each feed element 152 in each feed set 150. However, there can be more than one component for each feed element 152 or there can be several feed elements 152 for each component.

As shown, each lens set 110 has a hexagonal shape, and is immediately adjacent to a neighboring lens set 110 at each side to form a hexagonal tiling. Immediately adjacent lenses 112 may be in contact along their edges. The feed sets 150 are smaller in area than the lenses 112 due to the lens-feed optics, and can be substantially the same shape or a different shape than the lenses 112. While described herein as hexagonal, the lens may have other shapes, such as square or rectangular that allow tiling of the full array aperture. The feed sets 150 may not be in contact with one another and thus may avoid shorting or otherwise electronically interfering with one another. Because of the optical nature of the element beams formed at each lens, the feed displacement to produce scanned element beams is always substantially less than the distance in the focal plane from the lens center to its edge. Therefore, the number of feeds necessary to "fill" the required scan range or field of regard is less than for an array which must have the total aperture area fully populated by feed elements.

In some implementations of the lens array 100, the feed sets 150 fill approximately 25% of the area of each lens 112. The lens array 100 maintains similar aperture efficiency and has a total area similar to a conventional phased array of half-wavelength elements but with substantially fewer elements. In such implementations, the lens array 100 may include approximately only 25% of the number of feed elements as the conventional phased array in which the feed sets 150 fill 100% of the area of the lens array 100. Because the number of electrical and radio-frequency components used in the lens array 100 is proportional to the total number of feed elements 152 in the feed sets 150, the reduction of the number of feed elements 152 also reduces the number and complexity of the corresponding signal processing circuit components (amplifiers, transistors, filters, switches, etc.) by the same fraction. Furthermore, since only the selected feeds in each lens need be supplied with power, the total power consumption is substantially reduced compared with a conventional phased array.

As shown, the lens array 100 may be situated in a housing 200 having a base 202 and a cover or radome 204 that completely enclose the lens sets 110, feed sets 150, and other electronic components. In some implementations, the cover 204 includes an access opening for signal wires or feeds. The housing 200 is relatively thin and can form a top surface 206 for the lens array 100. The top surface 206 can be substantially planar or slightly curved. The lens sets 110 can also be situated on a substrate or base layer, such as a printed circuit board (PCB), that has electrical feeds or contacts that communicate signals with the feed elements 152 of the feed sets 150. The lens sets 110 may be arranged on the same plane, offset at different heights, or be tiled conformally across a nonplanar surface.

Figure 2:
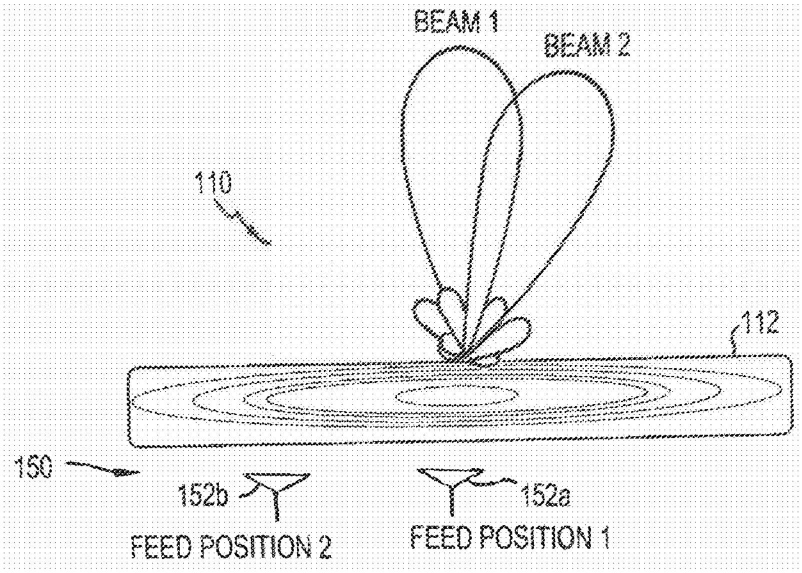
FIG. 2 is a side view of a moderate-gain lens and feed elements scanning their radiation patterns by feed selection for coarse pattern control.

FIG. 2 illustrates a lens set 110 having a lens 112 with multiple feed elements 152. Only two feed elements **152*a*, 152*b* are shown here for clarity but a typical feed cluster might have, for example, 19, 37, or more individual feeds. Each feed element 152 produces a relatively broad beam via the lens 112 at a specific angle depending on the feed element's displacement from the nominal focal point of the lens 112. In the example illustrated in FIG. 2, the first feed element 152*a* is directly aligned with the focal point of the lens 112 and generates a Beam 1 that is substantially normal to the lens 112 or the housing top surface 206, and the second feed element 152*b* is offset from the focal point of the lens 112 and generates a Beam 2 that is at an angle with respect to the lens 112 normal or the housing top surface 206. Accordingly, selectively activating one of the feed elements 152*a*, 152*b* enables the lens set 110 to generate a radiation pattern in a desired direction (i.e., to beam scan by feed selection). Therefore, the lens set 110** may operate in a wide range of angles.

Figure 3:
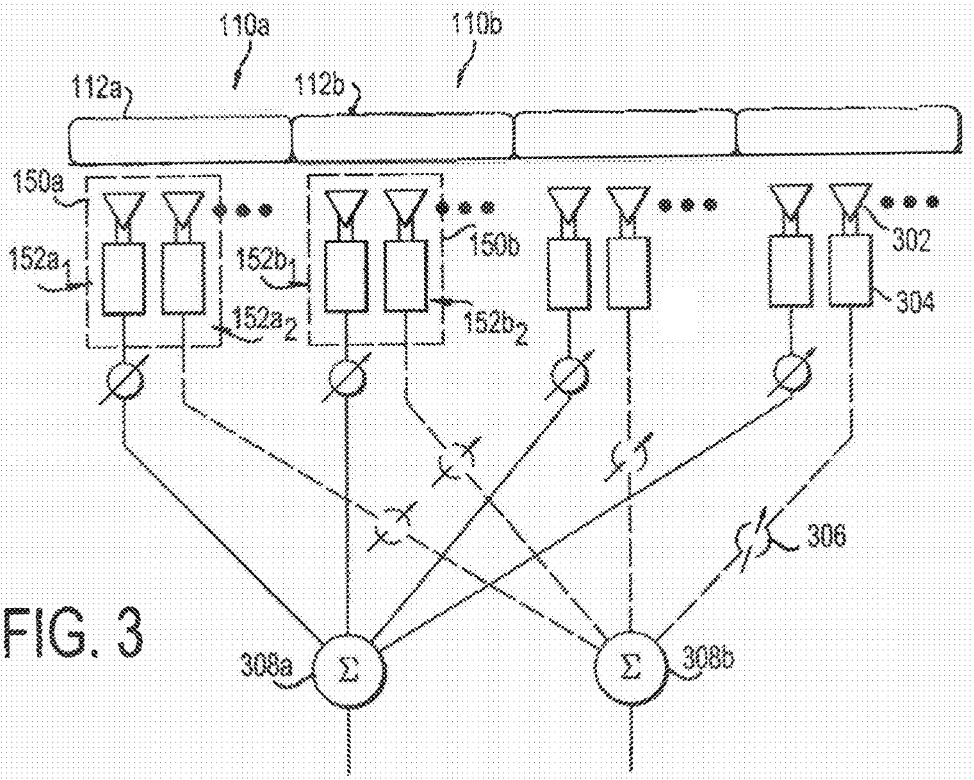
FIG. 3 is a block diagram of a multiple beam array of lens-feed elements phased to form multiple beams at desired scan angles with selected antenna elements.

FIG. 3 shows a simplified phased array having a lens array with multiple lens sets 110 and feed sets 150. Each lens set **110*a*, 110*b* has a lens 112*a*, 112*b* that is aligned with a respective feed set 150*a*, 150*b*, and each feed set 150*a*, 150*b* has multiple feed elements 152*a*, 152*b*. Each feed element 152 includes an antenna 302 and a sensing device 304, such as a reader or detector, connected to the antenna 302. The sensing device 304 is connected to a shifter 306 (time and/or phase), which is connected to a summer/divider 308. The shifter 306 provides a desired time and/or phase shift appropriate to the associated feed element 152. Each summer/divider 308 is connected to a respective one of the feed elements 152 in each of the feed sets 150. That is, corresponding feed elements 152 for each lens 112 are combined (or divided) in a phasing or time delay network. Accordingly, a first summer/divider 308*a* is connected to a first feed element 152*ai* of the first feed set 150*a* and a first feed element 152*b*1 of the second feed set 150*b*, and a second summer/divider 308*b* is connected to a second feed element 152*a*2 of the first feed set 150*a* and a second feed element 152*b*2 of the second feed set 150*b*. Each signal passes through the shifter 306 before or after being summed or divided by the summer/divider 308. Each summer/divider circuit 308 may be directly connected (e.g., through the shifter 306) to a specific feed element 152 within each feed set 150 or may connected through a switching matrix to allow dynamic selection of a particular desired feed 152 from each lens set 110**.

The circuitry within the sensing device 304 included in each feed element 152 may contain amplifiers, polarization control circuits, diplexers or time division duplex switches, and other components. Further, the sensing device 304 may be implemented as discrete components or integrated circuits. Further yet, the sensing device 304 may contain up- and down-converters so that the signal processing may take place at an intermediate frequency or even at baseband.

While only a single phasing network is shown here for each beam to keep the drawing from being too cluttered, it is understood that, for each beam, a transmit phasing network and a receive phasing network may be employed. For some bands, such as Ku-band, it may be possible to employ a single time delay network that will serve to phase both the transmit and receive beam, keeping them coincident in angle space over the entire transmit and receive bands. Such broadband operation could also be possible over other Satcom bands. The figure shows how two simultaneous beams may be formed by having two such phasing networks. Extensions to more than two simultaneous beams should be evident from the description.

In operation, a signal received by the first lens 112*a* passes to the respective feed set 150*a*. The signal is received by the antennas 302 and circuits 304 of the first feed set 150*a* and passed to the shifters 306. Thus, the first feed element 152*ai* receives the signal and passes it to the first summer/divider 308*a* via its respective shifter 306, and the second feed element 152*a*2 receives the signal and passes it to the second summer/divider 308*b* via its respective shifter 306. The second lens 112*b* passes the signal to its respective feed set 150*b*. The first feed element 152*b*1 receives the signal and passes it to the first summer/divider 308*a* via its respective shifter 306, and the second feed element 152*b*2 receives the signal and passes it to the second summer 308*b* via its respective shifter 306.

Signals are also transmitted in reverse, with the signal being divided by the summer/divider 308 and transmitted out from the lenses 112 via the shifters 306 and feed sets 150*a*. More specifically, the first divider 308*a* passes a signal to be transmitted to the first feed elements 152*ai*, 152*b*1 of the first and second feed sets 150*a*, 150*b* via respective shifters 306. And the second divider 308*b* passes the signal to the second feed elements 152*a*2, 152*b*2 of the first and second feed sets 150*a*, 150*b* via respective shifters 306. The feed elements 152*ai*, 152*a*2 of the first feed set 150*a* transmit the signal via the first lens 112*a* and the feed elements 152*b*1, 152*b*2 of the second feed set 150*b* transmit the signal via the second lens 112*b*.

Accordingly, the first summer/divider 308*a* processes all the signals received/transmitted over the first feed element 152 of each respective feed set 150, and the second summer/divider 308*b* processes all the signals received/transmitted over the second feed element 152 of each respective feed set 150. Accordingly, the first summer/divider 308*a* may be used to form beams that scan an angle associated with the first feed elements 152*a*, and the second summer/divider 308*b* may be used to form beams that scan an angle associated with the second feed elements 152*b*.

Accordingly, FIG. 3 illustrates an example in which a feed element or a plurality of feed elements included in a lens set of a phased array is selectively activated based on a position of the feed element relative to a lens of the lens set. Therefore, a beam produced by the lens set may be adjusted without any moving parts and therefore without introducing gaps between the lens and other lenses of the array.

Figure 4:
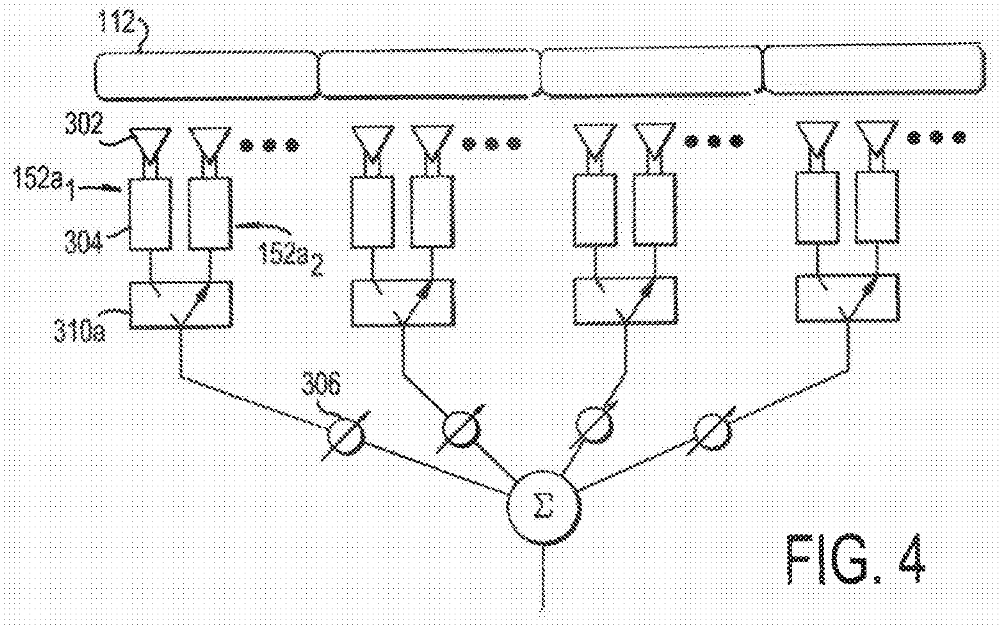
FIG. 4 is a block diagram of a lens array with single beam and switched feed selection.

FIG. 4 illustrates how one beam phasing/time delay circuit can be used to form a single beam by incorporating one or more switches 310 at each lens 112 to select the appropriate feed element for coarse pointing and then phasing the lens feeds for fine beam pointing achieving the high directivity of the overall array. The switch 310 is coupled between the detector or sensing device 304 and the shifter 306, which may be for example a time delay circuit or a phase shift circuit. Accordingly, the signals received over the first and second feed elements 152*ai*, 152*a*2 share a shifter 306. The switch 310 selects which of the feed elements 152*ai*, 152*a*2 to connect to the shifter 306, for receiving signals and/or for transmitting signals. In one example embodiment of the invention, all of the switches 310 can operate to simultaneously select the first feed element 152*ai*, 152*b*1 (or the second feed element 152*a*2, 152*b*2) of each of the feed sets 150*a*, 150*b* and pass signals between the first feed elements 152*ai*, 152*b*1 (or the second feed element 152*a*2, 152*b*2) and the summer/divider 308. Thus, the switches 310 enable one summer/divider 308 to support multiple feed elements. The shifter 306 is also controlled at the same time to provide the appropriate shift for the selected feed element 152.

In the examples of FIG. 3 and FIG. 4, coarse beam pointing of each lens 112 is obtained by the lens set circuitry selecting a specific feed element 152 (or feed location) in the focal region of each lens 112. The lens and feed combination produces a relatively broad beam consistent with the lens size in wavelengths. The direction of the beam is based on the displacement of the feed element 152 from a nominal focal point of the lens 112. By antenna circuitry combining the corresponding feed elements 152 in each lens set 110 with appropriate phase shifts or time delays, fine control of beam pointing and high directivity due to the overall array aperture size is obtained. The fine pointing of the overall array beam is accomplished with appropriate settings of the time delay or phasing circuits in accordance with criteria well known in the art for either analog or digital components. For digital time delay or phasing circuits, for example, the appropriate number of bits is chosen to achieve a specified array beam pointing accuracy.

Accordingly, FIG. 4 illustrates another example in which a feed element or a plurality of feed elements included in a lens set of a phased array is selectively activated based on a position of the feed element relative to a lens of the lens set. Therefore, a beam produced by the lens set may be adjusted without any moving parts and therefore without introducing gaps between the lens and other lenses of the array to allow for lens motion.

FIG. 5 depicts an optimized placement of the positions of the phase center of each lens set 110 to affect the symmetry/periodicity of the array 100 and thereby minimize grating lobes. Each lens 112 has a geometric center ("centroid") as well as a phase center. For lenses that are cylindrically symmetric, although the phase center is not necessarily collocated with the axis of symmetry for all scanning angles, an offset of the axis of symmetry of a particular distance and angle in the plane of the lens will correspond to the offset of the same distance and angle of the phase center, relative to the original configuration. In this way, the phase center of the lens may be adjusted by changing the location of the lens's axis of symmetry relative to the lens centroid. The phase center corresponds to a location from which spherical far-field electromagnetic waves appear to emanate. The phase center and geometric center of a lens may be independently controlled, and the phase center, not the geometric center, of each lens 112 determines a degree of grating lobe reduction.

Accordingly, a phase center 24 of each lens 112 is perturbed by optimized distances $r_i$ and rotation angles $\alpha_i$ of the lens axis of symmetry from a geometric center 20 (i.e., the unperturbed phase center) which would typically have been tiled on a uniform hexagonal or rectangular grid. The specific optimized placement of the lens axis of symmetry can be determined by any suitable technique, such as described in the Gregory reference noted above. The position of the lens axis of symmetry determines the phase center. According to the methods in the Gregory reference, for example, disturbing the periodicity of the array by small amounts in this manner suppresses the grating lobes. This process functions because grating lobes are formed by the formation of a periodic structure, which is known as a grating. By eliminating the periodicity between elements, there is no longer a regular grating structure, and grating lobes are not formed. The number of lenses, the shape or boundary of the array, the number of feeds, or the location of the feeds beneath the lens do not change the principles of this mitigation strategy.

FIG. 6 depicts a version of the lens array 100 with a relatively low parts count where only one feed element 152 per lens is included per lens set. In the example illustrated in FIG. 6, each feed element is mechanically moved over the short range of focal distances in each lens to effect beam steering. FIG. 6(*a*) depicts a side view of the lens array 100 and FIG. 6(*b*) depicts a top down view of the lens array 100. A positioning system is provided that includes a feed support 170 and one or more actuators. The feed support 170 can be a flat plate or the like that has a same or different shape as the housing 200 and is smaller than the housing 200 so that it can move in an X- and Y-direction and/or rotate within the housing 200. The lens sets 110 are positioned over the combined feed support 170 so that the feed assembly (i.e., the feed support 170 and the feed elements 152) can be moved independently of the lenses 112. In this embodiment, the feed support 170 is not directly connected to, but is only adjacent to or in contact with, the lens spacer 114 or the lenses 112. The set of feeds 152 mounted to the feed support 170 are moved relative to the lenses to effect coarse beam scanning and the feeds are phased/time delayed to produce the full array gain and fine pointing. In the non-limiting embodiment shown, a first linear actuator 172 is connected to the support 170 to move the support 170 in a first linear direction, such as the X-direction, and a second linear actuator 174 is connected to the support 170 to move the support 170 in a second linear direction, such as the Y-direction relative to the stationary lenses. Other actuators can be provided to move the support 170 up/down (for example in FIG. 6(*a*)) with respect to the lenses 112, rotate the support 170, or tilt the support 170.

A controller can further be provided to control the actuators 172, 174 and move the feed elements 152 to a desired position with respect to the lenses 112. Though the support 170 is shown as a single board, it can be multiple boards that are all connected to common actuators to be moved simultaneously or to separate actuators so that the individual boards and lens sets 110 can be separately controlled. Accordingly, FIG. 6 illustrates an example in which an active feed element included in a lens set of a lens array is repositioned relative to a lens of the lens set without moving the lens. Therefore, a beam produced by the lens set may be adjusted without moving the lens and introducing gaps between the lens and other lenses of the phased array.

Figure 7:
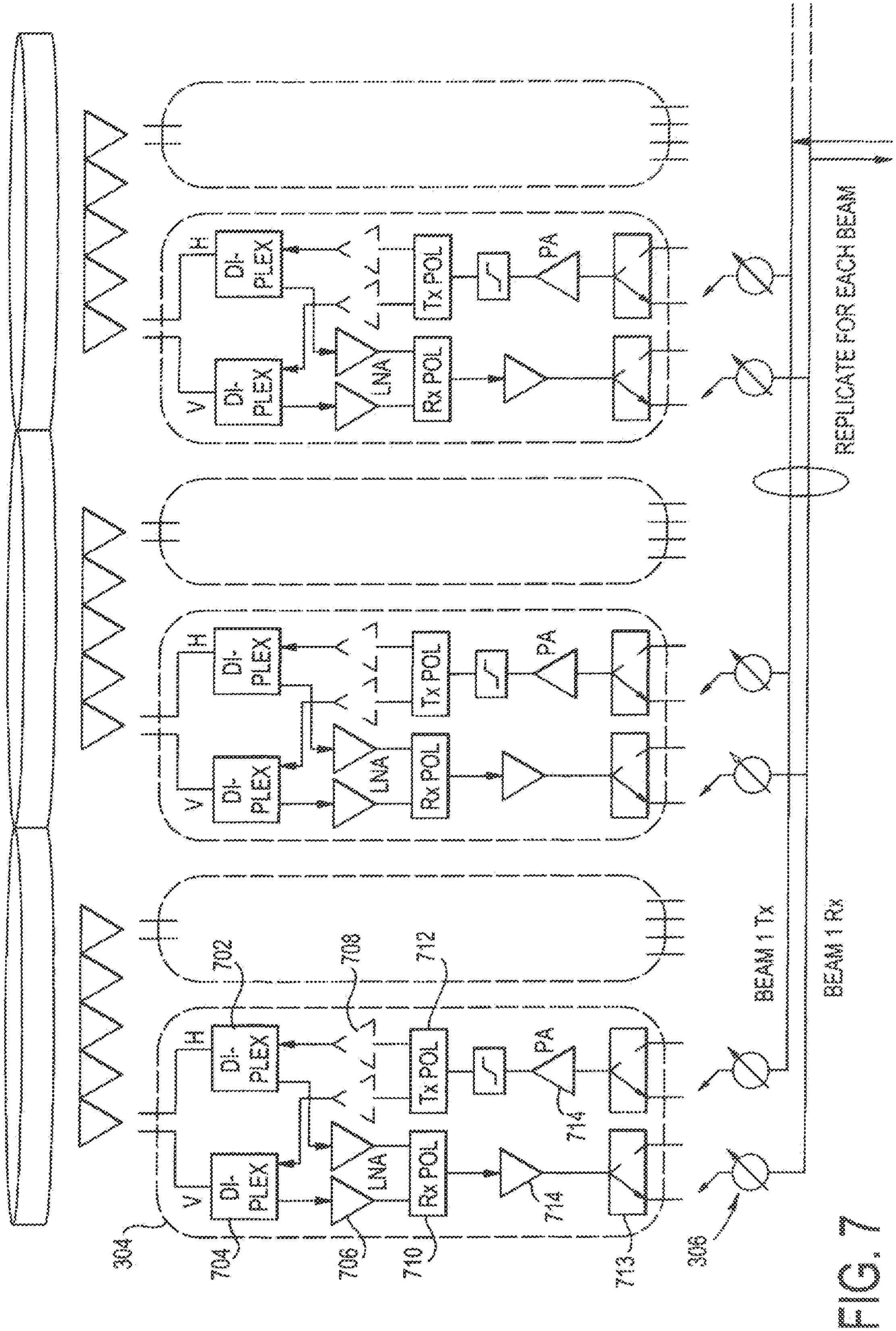
FIG. 7 is a functional block diagram of transmit-receive circuit for dual linear polarization lens feed.

FIG. 7 shows representative circuit diagrams for simultaneous transmit (Tx) and receive (Rx) in the same aperture including dual linear polarization tilt angle control as would be required for Ku-band geostationary Satcom applications. The beam phasing circuits at the bottom can be replicated for each independent simultaneous beam. FIG. 7 illustrates independent signal paths within the lens set circuitry 304 and separate shifters 306 for the receive and transmit operation of the system. While not illustrated, the receive and transmit operations may further have separate associated summers/dividers 308. In the illustrated example, the detector 304 in each feed element 152 includes separate diplexers 702 and 704 for horizontal and vertical polarized feed ports of the detector 304 to separate high-power transmit and low-power receive signals. The receive signal passes from the diplexers 702 and 704 to the low-noise amplifier 706, 706, a polarization tilt circuit 710, 712, an additional amplifier 714, and the feed-select switch 716 before reaching the shifter 306. The transmit signal from the shifter 306 passes through the switch 716, the amplifier 714, a polarization tilt circuit 712, 710, and a final power amplifier 708, 706 before being fed into the two diplexers 702 and 704, respectively.

Figure 8:
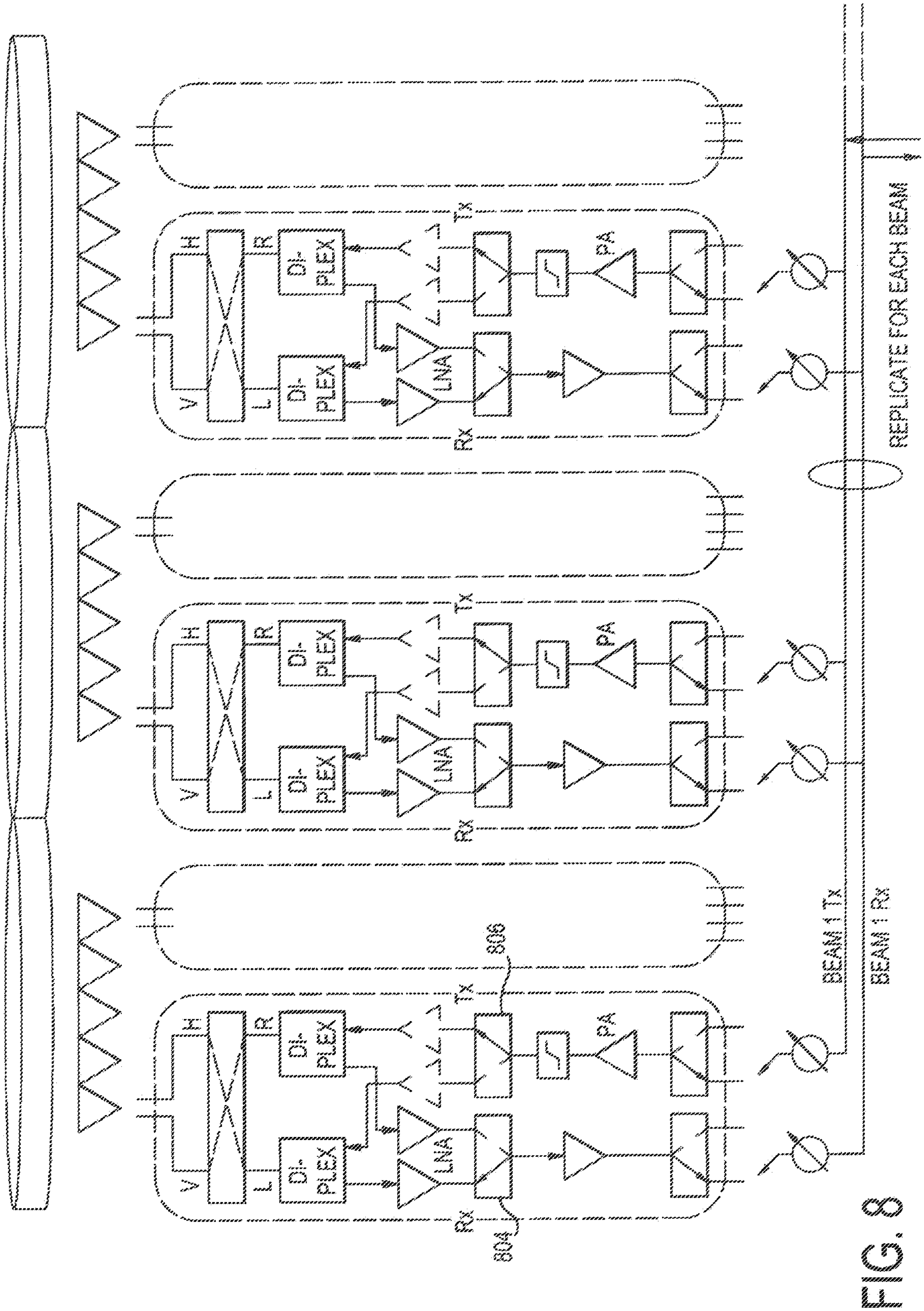
FIG. 8 is a block diagram of transmit-receive circuit for dual circular polarization lens feed.

FIG. 8 is a representative circuit diagram for a lens array of dual circularly polarized elements such as may be used for K/Ka-band commercial Satcom frequencies. FIG. 8 shows a similar diagram to FIG. 7, except for a change in operation of the polarization circuits 710, 712. K/Ka Satcom operation requires circular polarization, rather than tilted linear polarization as required for Satcom operation at Ku. Right-hand circularly-polarized or left-hand circularly-polarized signals may be achieved with a simple switch 804 for the receive and 806 for the transmit channels controlling which port is excited in a circular polarizer circuit or waveguide component, as compared to the complex magnitude and phase vector adding circuits 710 and 712 to achieve a linear polarized signal with an arbitrary tilt angle. The remaining aspects of the diagram are the same as in FIG. 7. Variations of this circuit may be understood by those skilled in the art. For example, feeding the two orthogonal linear polarization components of the feed using a hybrid coupler or an incorporated waveguide polarizer and orthogonal mode transducer (OMT) can provide simultaneous dual polarizations instead of switched polarizations.

FIG. 9 illustrates representative lens set circuitry for receive-only and transmit-only applications. FIG. 9(*a*) illustrates a receive-only antenna and FIG. 9(*b*) illustrates a transmit only antenna. The receive and transmit diplexers 702 and 704 are not required for a receive-only or transmit-only antenna, since the receive and transmit signals are not connected to the same feed element and do not need to be separated. The remaining aspects of FIG. 9(*a*) and FIG. 9(*b*) remain substantially the same as FIGS. 7-8.

Figure 10:
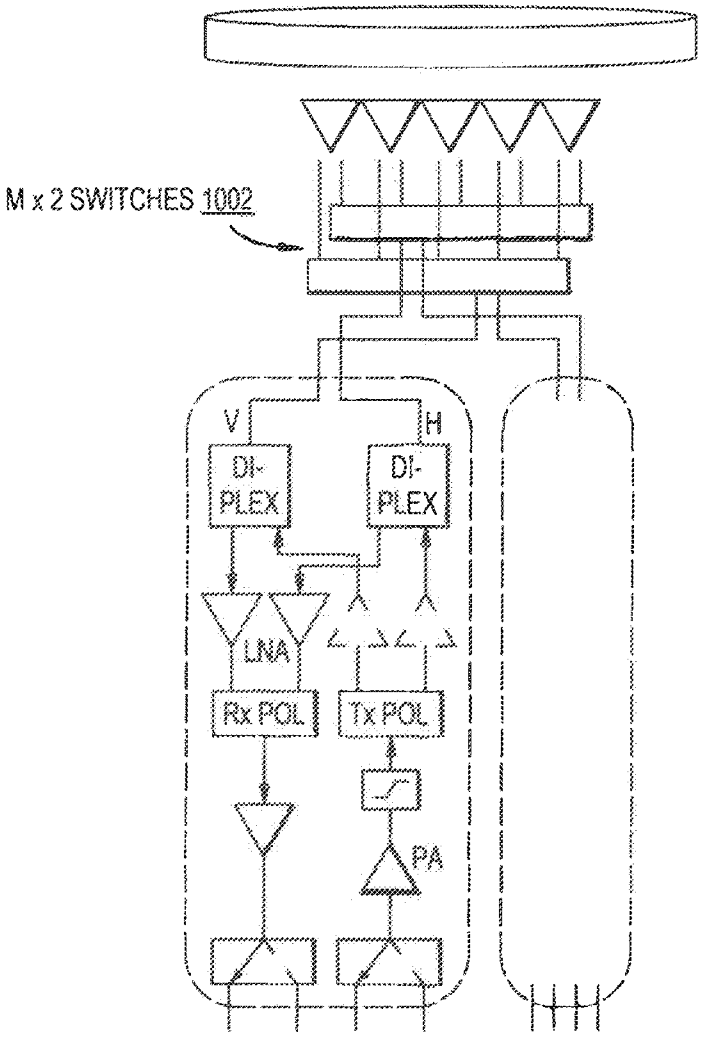
FIG. 10 is a functional block diagram for switch circuit to select feed.

FIG. 10 shows a further simplification and reduction in parts count by incorporating low-loss multi-port switches 1002 to select the appropriate feed element. The use of low-loss multi-port switches allows multiple feed elements to share a single set of power amplifiers, low-noise amplifiers, phase shifters, and other feed circuitry. In this way, the number of required circuit components is reduced while maintaining the same number of feed elements behind the lens. A larger switching matrix allows more feed elements to share the same feed circuitry, but also increases the insertion loss of the system, increases the receiver noise temperature, and decreases the terminal performance. A balance between the additional losses incurred by an additional level of switching, which generally (although not necessarily) is a two-to-one switch, must be balanced against the cost and circuit area of the additional receive and transmit circuits required when it is omitted.

FIG. 11 depicts a simplified digital beamforming (DBF) arrangement. The detector 304 is connected to a down-converter 1102. An Analog-to-Digital converter (ADC) 1110 is connected to the down-converter 1102. The detector 304 transmits a signal received via the antenna 302 to the down-converter 1102, which down-converts the signal. The down-converter 1102 transmits the down-converted received signal to the ADC 1106. The ADC 1106 digitizes the received signal and forms a beam in the digital domain, thereby obviating the need for analog RF phase or time delay devices (i.e., the shifter 306 of FIGS. 2-3 need not be provided). The digitized signal is then transmitted to a Receive Digital Processor 1110 for processing of the signal.

A corresponding process is provided to transmit a signal over the array. A Transmit Digital Processor 1112 sends the signal to be transmitted to a Digital-to-Analog Converter (DAC) 1108. The DAC 1108 converts low frequency (or possibly baseband) bits to an analog intermediate frequency (IF) and is connected to a mixer 1104. The mixer 1104 up-converts the signal from the DAC 1108 to RF, amplifies the signal for transmit, and sends the signals to the feed elements with the appropriate phase (e.g., selected by the transmit digital processor 1112) to form a beam in the desired direction. Many variations evident to those skilled in the art may be employed while maintaining the unique features of the invention.

Figure 12:
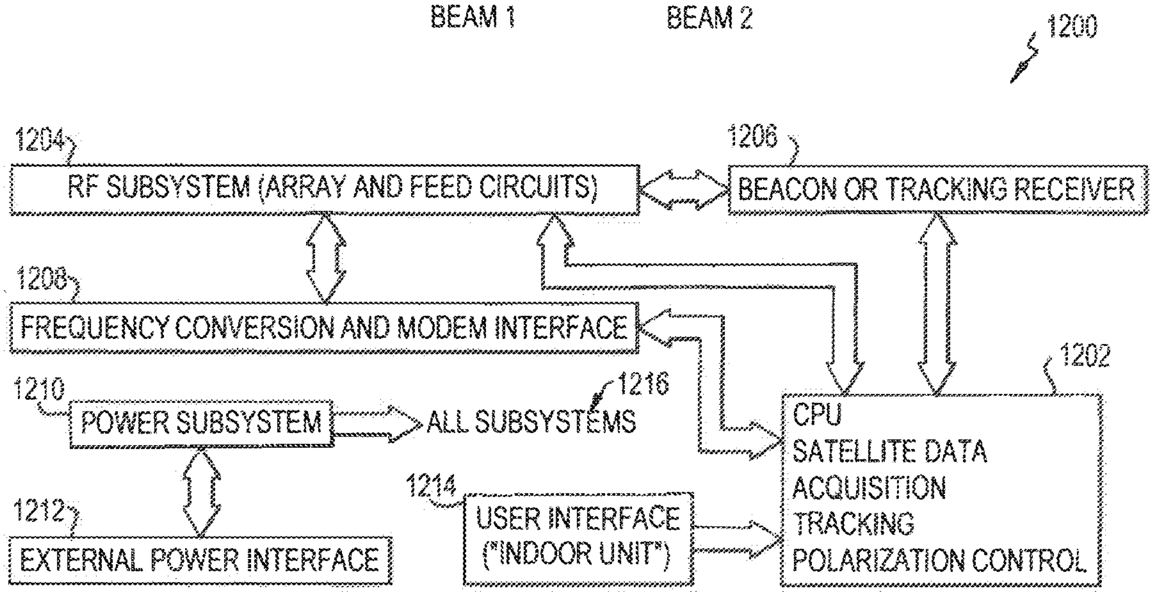
FIG. 12 is a system diagram for a Satcom terminal.

FIG. 12 is a simplified functional collection of subsystems that allow a lens array antenna to be incorporated in a fully functional tracking terminal for Satcom-on-the-move or for tracking non-geostationary satellites. Here, a system 1200 includes a processing device 1202 such as a Central Processing Unit (CPU), beacon or tracking receiver 1206, Radio Frequency (RF) Subsystem 1204, Frequency Conversion and Modem Interface 1208, Power Subsystem 1210, External Power Interface 1212, User Interface 1214, and other subsystems 1216. The RF Subsystem 1204 array may include any of the array and feed circuits of FIGS. 1-11 as described herein. The processing device 1202, beacon or tracking receiver 1206, modem interface 1208, power subsystem 1210, external power interface 1212, user interface 1214, and other subsystems 1216 are implemented as in any standard SATCOM terminal, using similar interfaces and connections to the RF subsystem 1204 as would be used by other implementations of the RF subsystem, such as a gimbaled reflector antenna or conventional phased array antenna. As shown, all the components 1202-1214 can communicate with one another, either directly or via the processing device 1202. Accordingly, FIG. 12 illustrates one context in which multiple beam phased array antenna systems, as described herein, may be integrated.

Figure 13:
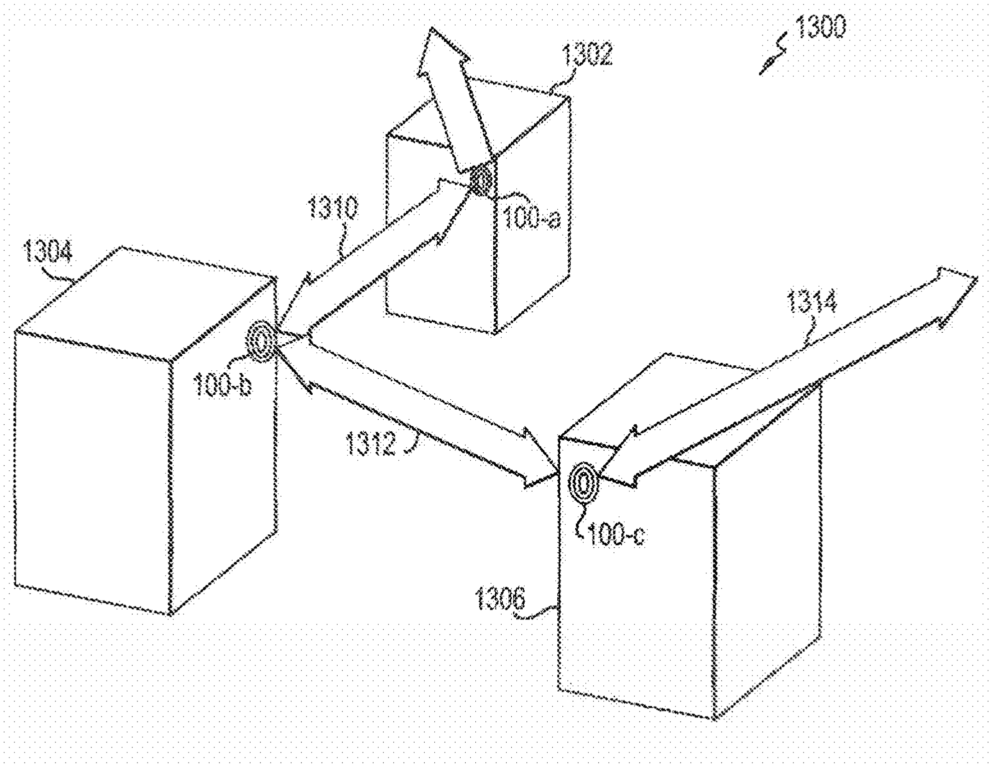
FIG. 13 is a diagram for a wireless point-to-multipoint terrestrial terminal.
Figure 14A:
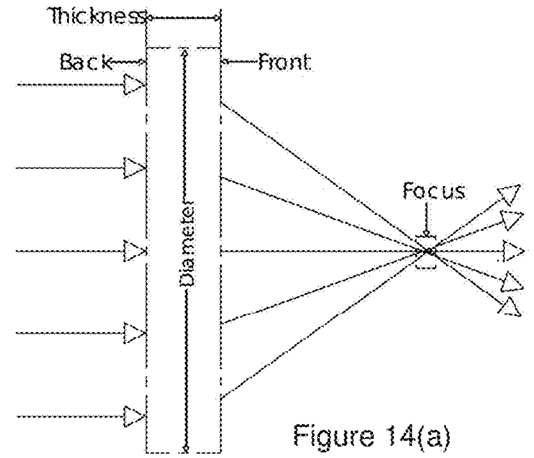
FIG. 14 illustrates behavior of an arbitrary lens showing reception of a plane wave (a,c), and transmission from a point source (b,d). The response of the lens to on-axis (a-b) and off-axis (c-d) beams is also demonstrated.
Figure 14B:
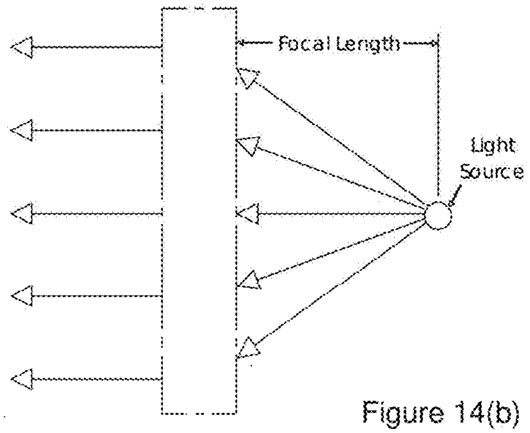
Figure 14C:
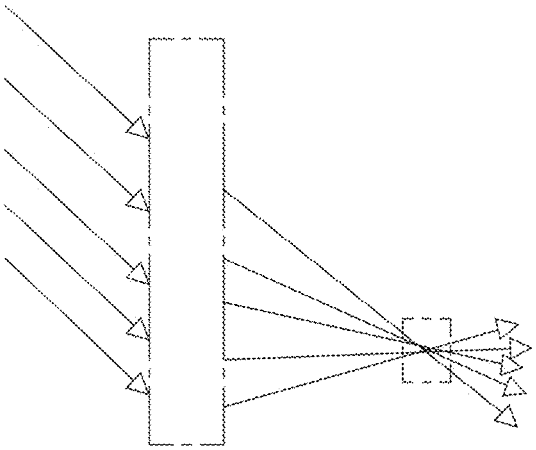
Figure 14D:
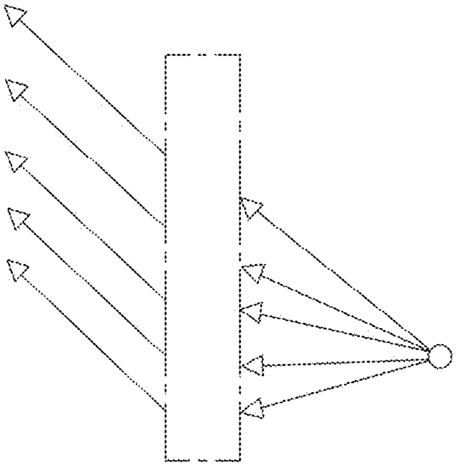

FIG. 13 demonstrates the use of multiple lens-based antenna terminals in a terrestrial context. Based on dynamic, real-time conditions and communication demands, the terminals can re-point their beams to establish simultaneous communications with multiple targets to form a mesh or self-healing network. In such a network, multiple antenna terminals 100*a-c* located on locations 1302, 1304 and 1306, which may be buildings, towers, mountains, or other mounting locations can dynamically establish point-point high-directivity communication links 1310, 1312, and 1314 shown as broad bidirectional arrows between themselves in response to communication requests or changing environmental conditions. For example, if antennas 100*a* and 100*b* are communicating over link 1310, but the link is interrupted, the communications path can reform using links 1312 and 1314 using antennas 100-*b* and 100-*c*. This allows the use of highly-directional antennas in a mesh network, which will improve signal-to-noise ratio, power levels, communication range, power consumption, data throughput, and communication security compared to a mesh network composed of conventional omnidirectional elements.

Advantages of the Invention

An embedded element radiation pattern is the radiation pattern produced by an individual element in a phased array while in the presence of the other elements of the phased array. Due to interactions between the elements (e.g., mutual coupling), this embedded radiation pattern differs from the pattern the element would have if the element were isolated or independent of the other elements. Given the embedded radiation element pattern(s) of one or more elements of the phased array, the radiation pattern of the array as a whole may be computed (e.g., using pattern multiplication). In typical phased arrays, the element pattern has a fixed beam direction. The phased array according to the present disclosure includes elements (e.g., lenses, aperture antennas) that may have steerable radiation patterns.

The lens array 100 includes elements that are electrically large compared to the half-wave elements used in conventional phased arrays, and implemented in such a way that the radiation pattern of each element may be steered to point broadly in the direction of desired beam scanning. An embedded element radiation pattern and beam direction of each lens 112 (e.g., an array element) of the lens array 100 is determined by the location of the corresponding active feed element 152 relative to the focal point of the lens 112. Accordingly, the array 100 has a flexible radiation pattern.

Any kind of lens may be used in the array 100, such as a homogeneous dielectric lens, inhomogeneous gradient-index dielectric lens, a lens composed of metamaterial or artificial dielectric structures, a substantially flat lens constructed using one or more layers of a metasurface or diffraction grating, flattened lenses such as Fresnel lenses, hybrid lenses constructed from combinations of metamaterial and conventional dielectrics, or any other transmissive device that acts as a lens to collimate or focus RF energy to a focal point or locus. In some embodiments, movement of the location of the active feed element 152 is achieved without moving parts using a cluster of multiple independently-excited feeds 152 that is scanned by changing which of the feeds 152 is excited, as explained above with reference to FIGS. 3 and 4. Alternatively, the same effect can be achieved with only a single feed 152 behind each lens 112 with an actuator 172 and/or 174 to move the element 152 relative to the lens 112, and thus change beam direction of the element pattern, as explained above with reference to FIG. 6. Each lens 112 can have an independent pair of actuators 172, 174, or a single pair of actuators could move the feeds of all lenses together.

Therefore, using relatively electrically large lenses as elements of a phased array enables the phased array to have a tunable or scannable element pattern. Further, using lenses as elements of the phased array enables an entire array aperture may to be covered by radiating sub-apertures (e.g., the lenses). This may increase aperture efficiency and gain of the array antenna.

Another benefit of using lenses with steerable beams as elements of a phased array is that a phased array that includes lenses as elements may include fewer electrical and RF components as compared to a conventional phased array. In an illustrative example, the phased array 100 includes 19 lens sets 110 (i.e., elements) having a diameter of 13 cm each and arranged in a hexagonal tiling pattern to efficiently fill an overall aperture that is roughly equivalent in performance to a 65 cm diameter phased array. The area behind each lens 112 may be only partially covered or filled by the feed elements 152, whereas in a conventional phased array, the entire surface of the aperture of the phased array may be covered with feed elements. Further the feed elements 152 may be no more densely packed than in the conventional phased array (e.g., half-wave). Accordingly, the phased array 110 may include fewer feed elements as compared to the conventional phased array. Since each feed element in either the conventional or lens-based phased array includes associated circuitry (e.g., the detector 304), reducing the number of feed elements may reduce the number of circuits included in the phased array 100. In addition, because only one feed element 152 may be active at a time per lens 112 to generate a beam, some embodiments of the lens array 100 allows circuits, such as the shifter 306, to be shared by multiple feed elements 152, as described with reference to FIG. 4. Accordingly, the lens array 100 may include a further reduced number of circuits. In an example, 4000 shifters required in a 4000-element conventional phased array may be reduced to as few as 19 shifters 306 in the preferred embodiment (i.e., one for each of the lenses 112). Therefore, the phased array 110 in this example may have fewer electrical and RF components as compared to a conventional phased array with the typical half-wave feed elements.

Further, the lens array 100 may consume less power as compared to a conventional phased array. In an illustrative example, the lens array 100 operates at a transmit RF power of 40 W (46 dBm). The total transmit power is distributed over the lens modules 110 of the lens array 100 (i.e., the elements of the phased array), where in each of the lens modules 110 a single feed element 152 is activated to create a single beam. As described above, one embodiment of the lens array 100 includes 19 lens modules 110. For this reason, it is necessary for each feed element 152 to handle about 1/19 of the total 40 W power (i.e., slightly more than 2 W or 33 dBm). The unused feed elements 152 in each of the lens sets 110 may be turned off and need not dissipate any quiescent DC power for either the receive or transmit circuitry. Accordingly, the lens array 100 may consume less power as compared to a conventional phased array in which each feed element is activated. In an example of the lens array 100, each of the lens sets 110 includes between 20 and 60 independent feed elements 152 behind the lens 112. A receive-only implementation of the lens array 100 may be expected to consume less than 10% of the DC power of the equivalent conventional receive-only phased array aperture.

The beamforming system for the lens array 100 may include the feed element 152 switches 1002 and 716, the shifters 306, the summation/dividers 308, the processing device 1202, or a combination thereof. To generate a beam in a desired direction, the processing device 1202 selects positions of an active feed element for each lens set 110 and computes the appropriate phase or time delay for each lens set 110. The time/phase delay and power combination/division may be performed before or after the upconversion/downconversion step at the RF, IF, or Baseband. The processing device 1202 sets the positions of the active feed elements by sending control signals to activate one of the feed elements 152 for each of the lens sets 110 or by sending control signals to adjust positions of the feed elements 152 using one or more of the actuators 172, 174. The processing device 1202 further sends one or more control signals to one or more of the switches 1002, 716, the shifters 306, the summation/dividers 308, or a combination thereof to set the time/phase delay and power combination/division for each lens set 110.

While GRIN lenses are the preferred embodiment for many applications, the lenses 112 need not be GRIN. For example, in applications that deal with a limited field of regard or limited bandwidth, smaller homogeneous lenses may suffice. Also, in some circumstances, metamaterial lenses or flat lenses composed of metasurfaces or artificial dielectrics may be optimal. Generally, inhomogeneous lenses designed according to the optimization method of application Ser. No. 62/438,181 will provide better radiation patterns over any given beam steering or scanning range (particularly as the scanning angle increases past 45 deg), and shorter focal lengths than homogeneous lenses, and will provide better broadband frequency responses than metamaterial or metasurface-based lenses.

Satellite communications antennas must limit their sidelobe power spectral density (PSD) envelopes to meet Federal Communications Commission (FCC) and International Telecommunication Union (ITU) standards. This requires careful control of sidelobes. However, for the lens array with electrically large lens sets 110 as described herein, grating lobes are created when sidelobe energy from all the lens sets 110 constructively interferes in an undesired direction. However, the high-directivity of the radiation patterns of the lens sets 110 may reduce many of the effects of the grating lobes, since the directivity of the lens radiation patterns, which is multiplied by the array factor, drops off quickly, unlike the response of a conventional array.

Ordinarily, the use of a high-directivity array element (e.g., lens) to mitigate the effect of grating lobes would result in a very narrow scanning range within the angular width of the array radiation pattern. However, allowing the lens sets 110 themselves to scan their embedded element patterns across the desired field of view preserves both the scanning performance and radiation pattern profile of the original antenna. Additional mitigation of the grating lobes may be obtained by perturbing the locations of the phase centers to break the symmetry of the regular grid of lens sets 110, as described with reference to FIG. 5.

Breaking the symmetry (periodicity) of the lens sets 110 positions in two or three dimensions reduces the degree to which the energy will constructively interfere in any direction. Furthermore, the location of the phase centers of the lens sets 110 may be arranged on a nonuniform, aperiodic grid to minimize the effect of grating lobes. The physical locations of the phase centers in one, two, or three dimensions are randomized and/or optimized to minimize the grating lobes and improve the radiation pattern. The phase centers may be selected by a stochastic optimizer in either an arbitrary or pseudo-ordered fashion as a part of the terminal design process. The lens sets 110 are constructed such that their physical center and phase center (generally coincident with the axis of symmetric within the lens) are spatially separated, where each lens in the lens set 100 may have a different offset between the phase and physical center, as described with reference to FIG. 5.

Many variants of optimization methods may be applied to the reduction of grating lobes. As an example, the (x, y) location of the axis of symmetry of each lens 112 with respect to the geometric center of the lens set 110 when in its proper location of the periodically-tiled phased array 100 is encoded as a constant in a hexagonal or rectangular lattice with a variable offset. The offset may be encoded in two variables for Cartesian, cylindrical, or some other convenient coordinate system. A stochastic optimization algorithm (such as Genetic Algorithm, Particle Swarm, or Covariance Matrix Adaptation Evolutionary Strategy, among others) coupled with a software routine for predicting the array factor and resulting array pattern from a combination of embedded lens radiation patterns and lens set 110 locations is then used to select the specific parameterized offsets for the phase center of each lens 112 element, as controlled by the axis of symmetry of each lens 112 element. The axis of symmetry location, and thus the phase center locations, are fixed when the array is manufactured, and does not vary during operation. The small offset of the axis of symmetry from the geometric center of the lens introduces only a small difference in coarse beam-pointing angle between adjacent lens sets 112 (which can be corrected for by corresponding small changes in the location of the feed array 150 beneath the lens set 112), and the same feeds 152 can be selected between adjacent lens sets 112 to point the coarse beam in the desired direction for the entire array. In all of these cases, the space occupied by the lens sets 112 do not change, but the location of their axis of symmetry does change to control the phase center. As described herein, the lens array 100 may offset the phase center of the lens 112 without changing the geometric center (centroid) of the lens set 110 or introducing gaps in an aperture of the lens array 100 (e.g., using the actuator(s) 172, 174.

The optimizer can minimize the grating lobes via the array factor alone, or can apply the embedded element (e.g., lens set) radiation patterns to the array factor and optimize the radiation pattern sidelobes directly. Considering the array pattern directly requires more sophisticated multi-objective optimization strategies A hybrid approach involves constructing a worst-case mask that the array factor must satisfy to guarantee that the sidelobes will satisfy the regulatory masks at all angles and frequencies.

The size of the lens 112 is a trade of cost vs. performance and complexity. Increasing the size of the individual lens 112 reduces the number of elements in the phased array, thus simplifying the circuitry, but also increases the lens set 110-lens set 110 separation distance, the magnitude of the grating lobe problem, and the cost and complexity of each individual feed element 152. Reducing the size of the individual elements increases the number of lens sets 110, but reduces the grating lobes, and the cost and complexity of each feed element 152 and lens set 110.

The use of electrically-large phased array elements (e.g., lens sets) with individually electrically-scanned patterns may be worthwhile if the element has much lower cost for a given aperture size compared to the cost of the conventional phased array elements that would otherwise fill that area and produce similar antenna terminal performance. For a switched-feed scanning lens antenna, the cost of the lens itself is relatively small and the cost of the array antenna may be proportional to the number of feed elements and their circuitry.

In some examples of the phased array 100, only a fraction of the area (25-50%) behind the lens 112 in each lens set 110 is populated with feed elements 152, and the feed elements 152 may be separated by more than half of a wavelength. For this reason, when considering a given aperture area that can be covered by a lens set 110, the cost for the lens set 110 can be much smaller when compared to the equivalent phased array that includes relatively more feed elements.

Each feed element 152 behind a given lens 112 is associated with a particular set of circuits depending on the application of the array as a whole. The simplest case is either a receive-only or transmit-only single-polarization circuit. A controllable polarization circuit for operation in Ku-band tilted Horizontal/Vertical polarized SATCOM, or a circular polarizer for K/Ka SATCOM, together with a dual-polarized feed antenna 152, can be used to support either mobile operation or polarization-independent operation.

Combined receive/transmit operation in a single terminal can be performed with an active transmit/receive switch for time-division duplexing, or by using a diplexer circuit element for frequency-division duplex operation, as described with reference to FIGS. 7, 8, and 10. The diplexer element increases the cost and complexity of each element, but there is a significant advantage to using only a single combined receive/transmit aperture rather than two separate apertures.

The lens array 100 may include a single shifter 306 in each lens set 110 for each supported simultaneous beam, rather than one for each feed element 152 as would be required in a conventional phased array, as described with reference to FIG. 4. In some examples where the low loss multi-port switches 1002 correspond to a low-loss N:1 switch, a single detector 304 is included in each lens set 110, and the power is switched between the set of all feed elements 152 behind the lens 112 using the low loss multi-port switches 1002. There is a trade-off between acceptable switching losses and the number of detectors 304 for each lens to maximize performance while minimizing cost. The performance, availability and relative cost of the switching circuit 1002 and detector 304 dictates the appropriate number of feed elements to be switched into a single detector 304 for a given application.

Due to the relatively large element separation of the lens sets 110 and the relatively small number of lens sets 110 in the lens array 100, the shifters 306 may have relatively higher discretization as compared to those of a standard phased array. For example, the shifters 306 may correspond to 8-bit or higher number of bits time delay units, rather than the 4 or 6-bit time delay units of a typical conventional phased array. However, due to the relatively small number of lens sets 110 and associated shifters/time delay units 306 in the phased array 100, the additional resolution of the shifters 306 may not represent a significant cost.

In contrast with other large-element phased arrays, such as the Very Large Array of Napier (27 gimbaled reflector antennas, each 25 m in diameter), the lens array 100 of lens sets 110 proposed herein can support multiple simultaneous beams in nearly arbitrary directions within a field of regard. This is implemented by exciting two or more separate feed elements 152 behind each lens 112 with a separate input signal and time offset unique to each lens set 110. Since each feed element 152 of a single lens 112 will radiate an independent beam, an array of lens sets 110 can generate independent high-directivity beams.

In contrast with conventional phased arrays, the array 100 of lenses 112 herein can support multiple beams with a minimum of added circuitry, while a conventional (analog) phased array would replicate the entire feed network for each beam. Since only one feed element 152 and one phase shifter 306 is activated to produce a single, beam, two independent beams may be included by adding one layer of additional switches, and one additional phase shifter 306 to each lens set 110.

The lens array 100 is described as a ground terminal for satellite communications, and could be used for both stationary and mobile ground terminals. In this communication mode, potential mounting and applications may include schools, homes, businesses, or NGOs, private or public drones, unmanned aerial systems (UAS), military, civilian, passenger, or freight aircraft, passenger, friend, leisure, or other maritime vehicles, and ground vehicles such as buses, trains, and cars. The lens array 100 as described can also be applied for the space segment of a satellite communication system as an antenna on a satellite for multiple spot beams and/or shaped beams, for dynamically-reconfigurable point-point terrestrial microwave links, cellular base stations (such as 5G), and any other application that requires or is benefited by dynamic multiple beamforming.

The lens array antenna terminals may be used for stationary or mobile applications where the angular field of regard requires the beam or multiple beams to be formed over relatively wide spatial angles. For example, for a Satcom terminal atop an aircraft it is desirable that the range of angles beat least 60 degrees and even 70 degrees or more to ensure that the antenna can communicate with geostationary satellites at various orbital locations relative to the aircraft. For non-geostationary satellite systems, the beam or beams must be able to track the satellites as they pass overhead, whether the terminal is stationary, e.g. atop a building or on a tower, or mobile such as on a vehicle. In both cases the range of angles depends on the number and locations of the satellites and the minimum acceptable elevation angle from the terminal to the satellite. Therefore, antenna systems must generally have a broad field of regard or the range of beam steering angles.

It is further noted that the description uses several geometric or relational terms, such as thin, hexagonal, hemispherical and orthogonal. In addition, the description uses several directional or positioning terms and the like, such as below. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact because of, for example, tolerances allowed in manufacturing, etc. And, other suitable geometries and relationships can be provided without departing from the spirit and scope of the invention.

As described and shown, the system and method of the present invention include operation by one or more circuits and/or processing devices, including the CPU 1202 and processors 1110, 1112. For instance, the system can include a lens set circuit and/or processing device 150 to adjust embedded radiation patterns of the lens sets, for instance including the components of 304 and associated control circuitry; and an antenna circuit and/or processing device to adjust the antenna radiation pattern, which may take the form of a beamforming circuit and/or processing device such as 306 and 308, or their digital alternatives as in 1102, 1104, 1106, 1108, 1110, and 1112, and the antenna circuitry may include additional components such as 1202, 1206, and 1208. It is noted that the processing device can be any suitable device, such as a chip, computer, server, mainframe, processor, microprocessor, PC, tablet, smartphone, or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, Wi-Fi, etc.). The information may be stored on a computer hard drive, on a CD ROM disk or on any other appropriate data storage device, which can be located at or in communication with the processing device. The entire process is conducted automatically by the processing device, and without any manual interaction. Accordingly, unless indicated otherwise the process can occur substantially in real-time without any delays or manual action.

The system and method of the present invention is implemented by computer software that permits the accessing of data from an electronic information source. The software and the information in accordance with the invention may be within a single, free-standing processing device or it may be in a central processing device networked to a group of other processing devices. The information may be stored on a chip, computer hard drive, on a CD ROM disk or on any other appropriate data storage device.

The lenses described below can, for example, function as collimators to facilitate communication links between a remote node and a feed antenna or source near the lens. Without considering for the moment the specifics of the lens construction, rays of microwave energy (light) from a distant source are collected by the lens and directed to a focal point, as in FIG. 14(*a*). Since the dielectric lens antenna is a reciprocal electromagnetic device, it is evident as in FIG. 14(*b*) that a microwave source placed at the focal point will produce a collimated beam of parallel rays emanating from the front of the lens. Moving the location of the source (FIG. 14(*d*)) in the radial direction is equivalent to changing the angle of the incident rays (FIG. 14(*c*)) and allows a lens antenna to be used as a beam steering or scanning antenna. The location of the source can be fixed in order to communicate between two fixed stations, but must be dynamically moved if the orientation or location of either station is not fixed. The movement of the source can be accomplished mechanically with electrically-controlled actuators that move the feed or feeds in the focal region, or as a plurality of closely-spaced feeds that can be independently electronically enabled or disabled. Scanning in the latter case includes repeatedly switching power between or among adjacent feeds or groups of feeds to smoothly vary the direction of the beam. It is evident that, as an optical device, multiple beams are readily formed by simultaneously exciting multiple feeds in a way similar to reflector antennas. This allows the antenna to track and communicate simultaneously with multiple remote stations in a mobile or non-geostationary satellite orbit (NGSO) environment.

The magnitude and phase excitation of the lens as well as the focal point can be improved by using a feed cluster of multiple elements rather than a single feed to generate a single beam. For example, a hexagonal cluster of seven elements is formed by a feed element and its six neighbors. The number of elements and the relative magnitude and phase difference between elements within the currently active cluster can be used to tailor the electric field distribution or aperture taper of the lens in a similar way as is commonly used for reflector antennas. The use of overlapping feed clusters rather than single feeds can allow finer control over beam directions and such properties as sidelobe levels with somewhat increased complexity of the feed and switching network. The use of microwave beam-forming networks such as Rotman lenses and Butler matrices are one solution to apply the proper magnitude and phase offsets to the cluster elements.

The field of regard is the range of incident angles for which the lens will focus the incident electromagnetic wave to an acceptably small focal spatial region or volume. Alternatively stated, it is the range of angles of radiated beams having acceptable properties such as directivity, gain, sidelobes and polarization that can be generated by feed antennas at different locations behind the lens. Such change of the feed position, whether by physical movement of the feed or by switching among a number of feeds in the focal region produces a beam that is steered or scanned over the angular range or field of regard. Simultaneous activation of a number of feeds can yield a sensor that can "see" sources over a wide field of regard at a given instance of time.

A lens has front and back surfaces that bound a region containing some specified material or materials. The back surface of the lens is defined to be the surface closest to the focal point. The described lens apertures can be built in different shapes depending on the application without changing their fundamental behavior, such as but not limited to, circular (FIG. 15(*a*)), hexagonal (FIG. 15(*b*)), and square (FIG. 15(*c*)) outlines. The cross-section of the lens can also take on different outlines, but is in practice limited to those shapes that produce desirable radiation properties over a wide field of regard, such as a meniscus lens with negative back and positive front surface curvature in FIG. 16(*a*), a plano-convex lens with flat back surface and positive front surface curvature in FIG. 16(*b*), or a convex lens with positive front and back surface curvatures in FIG. 16(*c*).

Figure 17A:
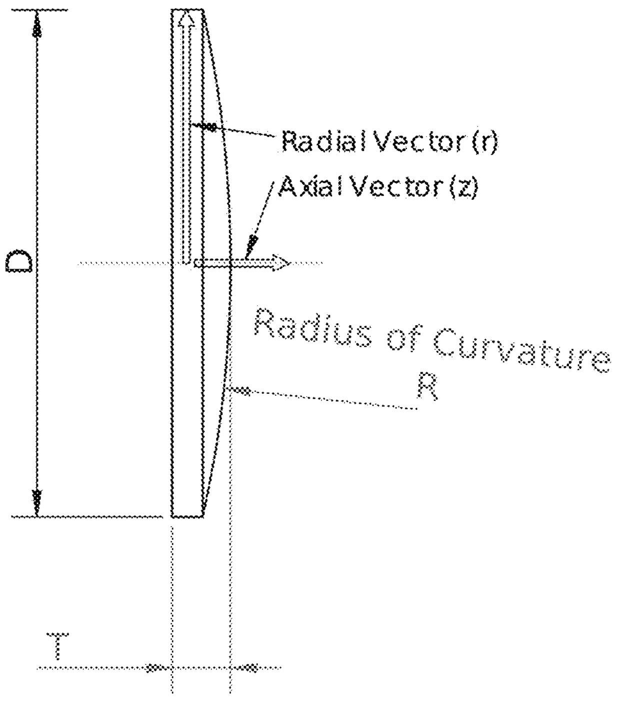
FIG. 17 illustrates a coordinate System and Dimensions for lens geometry.
Figure 17B:
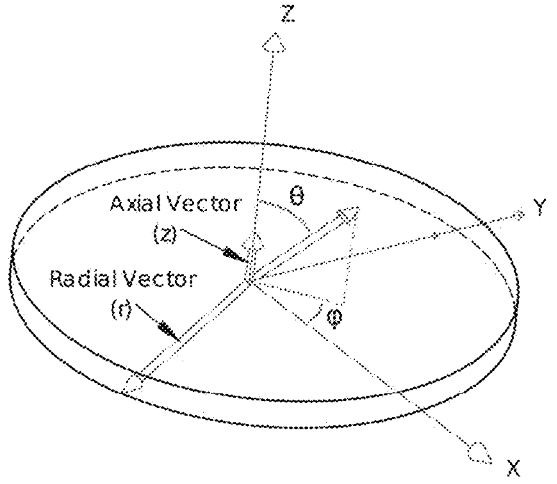

The geometry for a plano-convex lens, which is considered as the example in the rest of this document, is provided in FIG. 17(*a*)-(*b*). The back face of the lens lies in the x-y plane, while the lens axis is parallel to the z-axis in conventional cartesian coordinates. The outer lens geometry is specified as a diameter D, the radius of curvature for the front surface R, and the total lens thickness T.

The lens is not limited to operation over a narrow frequency range, but the scanning response and directivity of an antenna based on a suitable lens-feed arrangement are chosen for optimal performance for a given range of frequencies. The lens will continue to operate at higher and lower frequencies, but the overall system efficiency depends on the feed antenna and lens combination.

The dimensions of the lens depend on the specific desired frequency of operation, but the lens design itself is independent of and can be scaled to operate identically at any base frequency, including but not limited to the UHF-band, L-band, C-band, X-band, the Ku, K, and Ka satellite bands, and higher frequencies such as the V-band and Q-bands and for applications such as 4G and 5G. The physical implementation of a lens design will vary with the design frequency. Finer tolerances and spatial and material discretization are required for higher frequencies and/or physically larger lenses, which will produce an effective upper limit on the operational frequencies due to limitations in available manufacturing tolerances. A lens with good wideband operation is obtained by designing at the highest frequency of interest, while confirming the good response at lower frequencies once the design is complete.

To illustrate the invention for the sake of this document, all dimensions are provided for a non-limiting example lens operating at a central frequency of 12 GHz. Scaling the physical size of the lens is equivalent to changes in design frequency, and vice versa. This selected band is chosen for clarity of description and does not represent a limit, fundamental or otherwise, on the applicability or usefulness of the lens. All of the dimensions of an equivalent lens meant to operate at a different frequency should be scaled in a manner well understood in the art according to the ratio of the new free-space design wavelength relative to the free-space wavelength at 12 GHz.

The lens refractive index is specified and parameterized during the design process as a continuous function that appears as an inhomogeneous gradient at the outset. The gradient is later discretized to "layers or subsections" of materials, each "layer or subsection" being homogeneous and having its own dielectric constant, for fabrication. Computer representations of the continuous distribution may incorporate discrete material values, but the discrete values are very finely separated, and, while the computed index profile may be functionally equivalent to an ideal, continuous distribution, a physical implementation with discrete layers will have a more limited resolution. One computer representation of the lens refractive index profile is a 20-term cylindrically-symmetric polynomial of the r and z variables (as illustrated in FIG. 17), with the origin at the back center of the lens. The alpha terms represent parameters that are set as part of the design process.

$$n(r,z)=\alpha_0+\alpha_1 r^2+\alpha_2 r^4+\alpha_3 r^6+\alpha_4 z+\alpha_5 z^2+\alpha_6 z^3+\alpha_7 z^7+\alpha_8 r^2 z+\alpha_9 r^2 z^2+\alpha_{10} r^2 z^3+\alpha_{11} r^2 z^4+\alpha_{12} r^4 z+\alpha_{13} r^4 z^2+\alpha_{14} r^4 z^3+\alpha_{15} r^4 z^4+\alpha_{16} r^6 z+\alpha_{16} r^6 z^2+\alpha_{18} r^6 z^3+\alpha_{19} r^6 z^4$$

Although an equation for the refractive index profile is described here, a similar parametric equation can also be written for the dielectric constant. Specifying either one of the refractive index or dielectric constant is equivalent to specifying the other.

Increasing or decreasing the number of terms in the polynomial, or changing the powers to change the set of included terms, does not fundamentally alter the lens or design method. Alternative representations of the refractive index within the lens (for example, splines or other surface-based representations, sinusoids, Bezier surfaces, Zernike polynomials, etc.) do not change the fundamental aspects of the design paradigm, either. The continuous distribution is applied to the entire volume of the cylindrically-symmetric lens by interpreting the function in the cylindrical coordinate system, although modified methods that do not assume cylindrical symmetry may be useful in some circumstances.

For ease of fabrication, the constructed lens has thin isotropic homogeneous dielectric layers that fit together to form a solid volume. The number, shapes, and constituent materials of the layers are variable to meet the needs and constraints of the manufacturing process and available material systems. The lens can be constructed from a variety of materials, provided that the refractive index/dielectric constant is within suitable tolerances and the dielectric loss tangent is sufficiently small. Each effectively homogeneous layer of the lens may be constructed from a single material, or as an aggregate of high-index and low-index sub-regions arranged to produce a homogeneous response within the frequency band of interest.

Depending on the manufacturing method and the available materials, the fabricated lens may be discretized from the original continuous design according to values of refractive index, convenient spatial regions such as equal-thickness layers, or both. Spatial discretizations may follow contours defined by the index gradient, or may be defined based on convenient geometric assembly such as sheets, bars, cubes, or other shapes of different materials.

When considering construction using laminar layers of discrete material types, this lens can be implemented with different strategies for determining the boundary layers. The different discretization strategies may offer advantages when considering a fabrication strategy, but do not alter the overall operation of the lens.

The lens can be discretized into regular layers of uniform thickness, irregularly-shaped layers of uniformly-spaced refractive index, or irregularly-shaped layers of uniformly-spaced dielectric constant. When the layers are thin enough (which must be determined by measuring the behavior of a prototype or performing a full-wave computational simulation of the structure), the lens behaves identically regardless of the discretization model selected. Thinner layers with finer dielectric constant gradations are required for lenses operating at higher frequencies, or for physically smaller wavelengths. Lenses with a fine discretization chosen for a high frequency will operate well at lower bands, but coarse discretizations such as for lower frequency designs may suffer performance losses if operated well above their design range.

To minimize the scattering losses from the front and back lens surfaces, an anti-reflective coating (ARC) may be included. Some optimized lens designs that have near-unity refractive indices at their front and/or back surfaces may be able to omit the ARC, but this is an unusual case. Different ARCs can be applied without changing the fundamental lens design and characteristics. The coating can be included in the design and optimization process as well as integrated into the same manufacturing step as the lens, or it can be designed and applied using a different method. ARC design methodologies used for homogeneous optics may, with some limitations, be applied to GRIN lens elements [Morgan, Kenneth L., Donovan E. Brocker, Sawyer D. Campbell, Douglas H. Werner, and Pingjuan L. Werner. "Transformation-optics-inspired anti-reflective coating design for gradient index lenses." Optics letters 40, no. 11 (2015): 2521-2524] with reasonable results. A quarter-wave transformer based on the surface index of the lens, the simplest possible ARC, is fairly effective.

Electrically thin lenses may generate reflections internal to the lens, as well as at the surfaces, due to the high rate of change of the refractive index with respect to position compared to the wavelength. These internal scattering losses cannot be addressed by applying an ARC, but can be reduced by including limits on the rate of change of the refractive index in the optimizer.

The lens design process can, for example, make use of a multi-objective stochastic optimization algorithm, such as CMAES (Covariance Matrix Adaptation Evolutionary Strategy) [Gregory, Micah D, Zikri Bayraktar, and Douglas H. Werner. "Fast optimization of electromagnetic design problems using the covariance matrix adaptation evolutionary strategy." IEEE Transactions on Antennas and Propagation 59, no. 4 (2011): 1275-1285.], GA (Genetic Algorithm) [Weile, Daniel S., and Eric Michielssen. "Genetic algorithm optimization applied to electromagnetics: A review." IEEE Transactions on Antennas and Propagation 45, no. 3 (1997): 343-353.][Hadka, David, and Patrick Reed. "Borg: An auto-adaptive many-objective evolutionary computing framework." Evolutionary computation 21, no. 2 (2013): 231-259.], or PSO (Particle Swarm Optimizer) [Rahmat-Samii, Yahya. "Genetic algorithm (GA) and particle swarm optimization (PSO) in engineering electromagnetics." In Applied Electromagnetics and Communications, 2003. ICECom 2003. 17th International Conference on, pp. 1-5. IEEE, 2003.][Moore, Jacqueline, Richard Chapman, and Gerry Dozier. "Multiobjective particle swarm optimization." In Proceedings of the 38th annual on Southeast regional conference, pp. 56-57. ACM, 2000.]. These optimization algorithms are application agnostic, and can be applied to a number of different design domains by means of a well-defined interface of a numerically-computed cost function, and a set of optimization parameters or variables. The operation and use of optimization algorithms for engineering design applications are well-understood and documented in the literature. The optimization algorithm and accompanying numeric calculations are generally automated and implemented as a software program on a general-purpose processing device, such as a computer, having a memory. Individual aspects of the optimization, which might include adjustments to the input parameters and optimization settings, may be made manually by a human-in-the-loop.

The behavior of a particular lens design candidate during the optimization is predicted by a Geometric Optics ray tracer, which approximates the propagation of radio waves and/or light as idealized rays. Different implementations of the ray tracing algorithms may be used to compute the properties of the lens without changing the fundamental qualities of the disclosed design method. Each ray is considered independently, and is modified as it propagates throughout the simulation domain according to the local refractive index distribution [Evans, James. "Simple forms for equations of rays in gradient-index lenses." Am. J. Phys 58, no. 8 (1990): 773-778.]. Ray tracing is an approximate technique that is quite accurate in practice and orders of magnitude faster than a full-wave solver such as Finite-Difference Time-Domain (FDTD) or the Finite Element Method (FEM). A full wave solver is still necessary for final verification of the design.

One key aspect of the invention is the interaction between the optimizer and the ray tracer, with the use of microwave optimization metrics to classify the performance of a lens candidate based on the ray tracing outputs. Any suitable known ray tracer and optimizer can be utilized in the invention to provide independent calculations of fields from a collection of rays, the near-field to far-field calculation, integration of a far-field radiation pattern into directivity, and directivity as an optimization goal. The combination of these independent tools to design an antenna with a wide field of regard by mutually maximizing directivity for multiple beam angles based on the ray-tracing results of multiple distinct feeds forms a unique combination into a method and system of the present invention that allows for rapid, effective design of microwave-frequency gradient-index lens antennas with a wide field of regard. The combination of optical ray tracing to optimize a microwave lens by directly computing directivity and aperture efficiency for multiple field angles by exciting multiple sources represents the unique method and system of the invention to obtain the high on-axis and angular antenna performance. The design process is performed on a computer, but can require judgement from a skilled human in the loop to evaluate the relative quality of candidate designs, and to determine if a particular design meets the desired performance criteria.

Any of a large number of optimization algorithms, single or multi-objective, local or global, can be used to implement the design process. The optimization algorithm (1802) has internal state (1844) stored in memory (1910) and feedback characteristics evaluated by the processor (1900) that generate (1804) new sets of parameter values (1806,1812) based on prior responses (1842). The optimization-based design is performed in any suitable manner, such as by repeatedly executing the optimization algorithm, which itself repeatedly evaluates the simulation loop described below, for varying input parameters and goals until a satisfactory result is achieved. The evaluation of the simulation loop with the ray tracer and post-processed results is described in FIG. 18. A potential hardware implementation of the design process in a general-purpose computer is illustrated in FIG. 19.

The performance criteria for an optimization represent minimum thresholds of performance that are compared by the optimizer and the user to the outputs of the simulation engine, and are dependent on the specific application. The performance criteria (1856) for this design process based on the ray tracing engine and associated post-processing calculations include such parameters as directivity, gain, relative cross-polarization levels, axial ratio, aperture efficiency, receiver noise temperature, field of regard, and system thickness. These criteria must be selected by one skilled in the art (1854) to adequately describe the operational requirements of a successful design. Based on the results of one or more optimization cycles, the thresholds of acceptable values may be updated by the user to represent more realistic assumptions about the capabilities of a lens given the other design constraints.

At the completion of each simulation and result data post-processing cycle, the numerical outputs are compared (1834) either automatically by the optimizer or manually by the user to the thresholds set by the performance criteria to determine whether or not the design satisfies the constraints. The degree to which a particular simulation output satisfies or does not satisfy a constraint is encoded as a number or array of numbers (1836), referred to as the cost of the candidate, or the cost vector of the candidate, respectively, where smaller numbers represent a design that better satisfies the constraint. For example, to design an antenna with a gain of at least 35 dB at a single wavelength and angle of incidence, one possible method of computing the cost would be subtract the gain in dB computed by the simulation engine from 35; in this way, antennas with higher (better) gain than the threshold would have negative cost, which can be taken as an indicator by the user and/or the algorithm that the optimization has satisfied their goals, and that the decision (1838) can be made to end the current optimization (1840). Similar calculations can be performed to obtain a cost vector (list of independent costs) for antennas with optimized performance at multiple angles, frequencies, or other application-specific conditions. In this case, the calculations to obtain a single cost are repeated to compute the gain and associated cost for each unique configuration and then combined to form a vector of cost values. This optimization process computes a cost vector representing the inverse aperture efficiency (in dB) for each feed location requested in the simulation. The aperture efficiency is computed based on the directivity and the aperture area of the candidate lens. An aperture efficiency of 0 dB then represents an ideal, 100% efficient aperture.

The geometric and material constraints (1848, 1852) are also specified by one skilled in the art (1846, 1850) prior to beginning the optimization process. The geometric and material constraints represent limits on the dimensions and other properties of the design that are provided to the simulation engine, and can be determined without simulating the candidate structure. For this optimization process, these terms include the form of the parameterization equation for the refractive index gradient (polynomial, spline, etc.) and the number and numeric ranges of the optimization variables, the lens thickness, diameter, and surface curvature, the axial focal length, the particular type of feed antenna with corresponding far-field radiation pattern, the number of angular scanning locations to optimize, the feed radial locations while scanning, and the range of acceptable refractive index values. Of particular interest to the outcome of the design is the number and positions of the feeds used for the optimization; the positions of the feeds are placed by the user such that beams at sufficiently wide angles are realized to adequately cover the desired field of regard. Jointly maximizing the performance at each of the discrete feed locations is then equivalent to optimizing the antenna across the entire field of regard. Selecting feeds further separated from the center of the lens produces an antenna with wider field of regard, while using only feeds near the center of the lens produces an antenna with a narrower field of regard. The geometric and material design constraints are updated by the user throughout the design process based on the outputs of the optimization and application requirements to improve the results of future optimization runs.

Some subset of the dimensions and/or material properties within the design are selected by the user (1846) to be picked by the optimizer, and are referred to as optimization variables (1806,1812). The optimization variables each have a minimum and maximum bound, and particular combinations of variable values are judged to be valid or invalid based on the geometric and material constraints listed above. The optimizer creates a design candidate. This optimization uses the coefficients of the refractive index equation as the optimization variables that are selected by the optimizer, and leaves all of the remaining geometric properties of the lens to be selected and updated by the user (1846).

The optimization begins (1800) by the optimization algorithm (1804) selecting an initial set of values for the optimization variables (18806, 112) according to the rules of the particular optimization algorithm, which may involve either user input or pseudo-random number generation. The geometry and material properties (material gradients, thickness, diameter, surface curvature, etc) of the lens (1808) are then assigned from their respective optimization variables and fixed, user-selected properties. The set of input rays (1816) to the ray tracer is computed to model the far-field radiation pattern of a real feed antenna, such as an open-ended waveguide or patch antenna, based on the location(s) of the input sources. A plurality of independent ray distributions are generated by the processor based on a stored far-field radiation pattern from memory (1814) for one or more frequencies and feed antenna locations that approximate the continuous field distribution created by a plurality of feed antennas. The input ray distributions are then stored in memory. The selection of feed antenna is one of the user-specified geometric constraints and as such will affect the design, but the design method is not limited to a single type or class of feed antenna. The ray tracer (1818) loads the geometric data, material data, and the input ray distribution from memory (1910), then models the behavior of the input rays (1816) as they propagate through the lens and surrounding materials (1810) to produce a set of ray trajectories (1820), which are then stored in memory. The ray trajectories include polarization, phase, and magnitude data that are then used by the field calculator subroutine (1904) to compute and store in memory (1822) the complex-valued frequency-dependent near-field distribution (1824) at the exit face of the lens.

The near-field to far-field subroutine (1906) then computes (1826) using the method described by Balanisthe far-field electric field pattern (1828) due to the near-field distribution (1824) using the method described by Balanis [C. A. Balanis, "Antenna Measurements", Antenna theory, Analysis and Design, 3rd ed. Wiley New York (2005): 1001-1047.] at the output of the lens for each of the plurality of input sources, storing the resulting data in memory (1910). The antenna directivity is computed by the processor from the far-field data in memory according to the equations described by Balanis [C. A. Balanis, "Antenna Measurements", Antenna theory, Analysis and Design, 3rd ed. Wiley New York (2005): 27-132.] by integrating the far-field pattern (1830) and picking the maximum value as the peak directivity of the antenna for each of the plurality of independent feeds (1832). Gain and Aperture efficiency can be computed by the processor from the directivity pattern in the way well understood in the art. The directivities are then used together with the performance criteria in the processor (1900) to compute (1834) a cost vector or single cost value (1836) (depending on the needs of the optimizer). If the results satisfy the design constraints (1838), then the optimization terminates (1840), outputs the results (1914), and allows the user to verify and confirm the results with additional simulations in the standard way. Otherwise, the internal state of the optimizer (1844) in memory (1910) is updated (1842) by the processor (1908) in the particular way of the selected optimization algorithm, and the cycle repeats.

The particular internal state and methods of using and updating that state are specific to each optimization algorithm. This result of using directivity computed from the ray-tracing outputs at multiple beam angles to optimize the optical response of the GRIN lens represents the best way to obtain a high-aperture-efficiency all-dielectric gradient-index lens antenna.

The high-directivity, wide field of regard lens obtained from the design process above is a flexible building block for a large number of potential antennas. This process produces the design for a single lens that meets the user-specified constraints and performance goals specified at the start of the process. The resulting lens can be applied to different applications and in different configurations. Depending on the constraints and performance goals, the single-lens output of the design process may be used as-is as a high-gain antenna. Alternatively, constraints that specify a lower directivity and smaller size for a single lens will produce a lens design that is suitable for tiling in a planar or non-planar configuration and operation as a phased array antenna with electrically-large feeds. A plurality of small lenses can be combined to form a low profile high-gain phased array that merges the large, low-cost aperture of the optimized lens antenna with the scanning flexibility and control of a phased array. Using electrically-large pattern-reconfigurable array elements (multi-wavelength elements) reduces the volume, weight, and depth compared to a single-lens antenna while substantially reducing the cost and complexity of a conventional phased array. Extending the array to a dome can be used to increase the achievable field of regard above that of an individual lens by switching power between subsets of active lens elements.

Example Applications

The disclosed design method and associated design outputs of the method can be used for a number of possible applications, for example:

- High-speed point-point and point-multipoint data connections
- 4G and 5G cellular communications
- Unmanned aerial systems (UAS), including drones, unmanned aerial vehicles (UAVS) for military, civilian, and commercial use, commercial aircraft to provide on-board Internet connectivity
- SATCOM on-the-move
- Communications (one-way or two-way) with satellites in non-geostationary orbit (NGSO) and also allowing multiple beams for "make-before-break" connections with non-geostationary satellite constellations.
- Space-based satellite antennas for generating spot beams on the earth
- Receive-only satellite terminals Maritime mobile satellite communications (ships, yachts)
- Land Mobile satellite communications (bus, train, truck, RV, car)

These applications have varying requirements, and operate across a variety of microwave channels. A single or small number of lens designs can be extended to cover these applications by tiling a plurality of lenses to form a scalable, conformal phased array of electrically large elements that can be constructed with nearly arbitrary size and shape. The array can easily be conformed to the shape of the underlying structure, such the surface of a cylinder when mounting on the body of an aircraft.

Example Embodiments

An electrically small lens (about 5λ or five wavelengths where λ is the wavelength) is suitable for use as an array element for a phased array of such lenses having far fewer active elements compared with a conventional phased array. The optimization process described above is executed in order to design a suitable candidate design. See FIG. 17 for the lens geometry.

The first steps of the design process are for the designer to select the performance goals, geometric and material constraints, geometry settings, and optimization variables. The selections for this example embodiment are described in the text below.

The lens is designed for Ku-band operation at 12 GHz, and is desired to have better than −5 dB aperture efficiency for all beams formed within a cone with apex angle (or, field of regard) of 45 deg. The peak directivity for a 100% efficient aperture in dB is given by the equation below.

$$\text{Directivity}_{max,dB}=10*\log 10(4*pi*A/\text{lambda2})$$

For a lens with the geometric dimensions cylindrical aperture diameter D=13 cm, the directivity representing peak aperture efficiency is 24.2 dB. The performance goal for this design is to minimize the deviation for the directivity corresponding to each feed from 24.2 dB, allowing the candidate design cost for each respective feed to be computed as in the equation below.

$$\text{Cost[feed]}=24.2-\text{Directivity}_{max,dB}\text{[feed]}$$

The back surface of the lens is flat, the front surface is convex spherical with a radius of curvature of R=30 cm, and the thickness of the lens at the apex of T=1.5 cm.

Three open-ended WR75 waveguide feeds are selected as the excitations for this design, located at the center of lens at a focal length along the z-axis of 5 cm, and separated radially along the r-axis from the lens center by 0 cm, 1.2 cm and 2.4 cm.

The material gradient is represented in the design process as a 21-element polynomial in r and z where the r and z variables are interpreted in units of meters, as described previously, for the refractive index, where the 21 coefficients are assigned to be variables to be optimized by the optimizer with optimization ranges between positive and negative 10. The resulting refractive index profile within the lens is constrained to refractive indices between 1 and 4.5 to ensure that the resulting design that is produced as a result of running this process is manufacturable.

Figure 18:
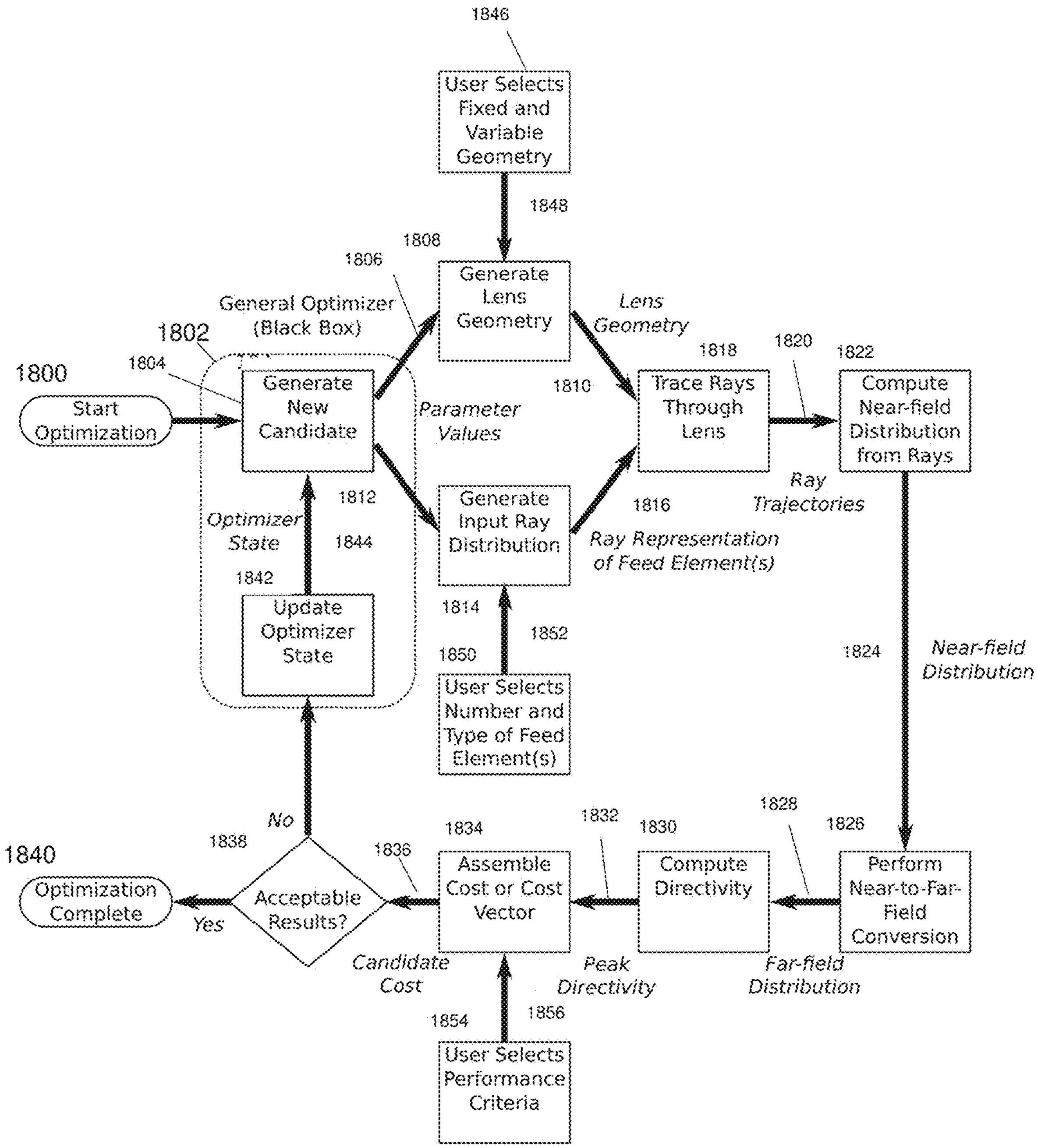
FIG. 18 illustrates a lens design and optimization flowchart.
Figure 19:
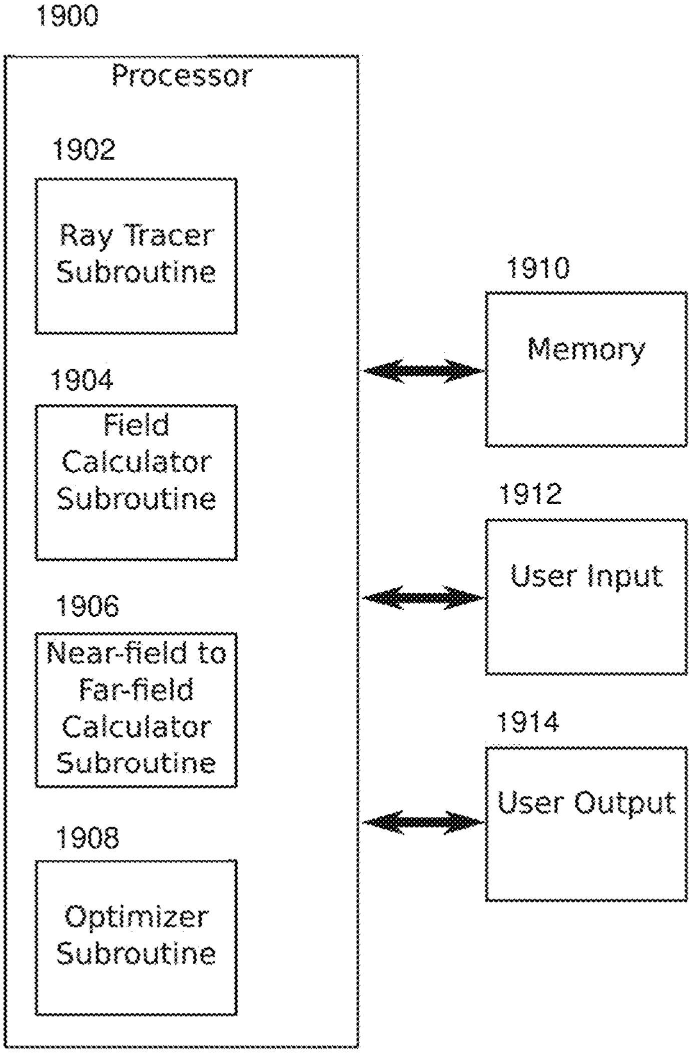
FIG. 19 illustrates a hardware diagram for general-purpose computer implementation of lens design process.
Figure 20A:
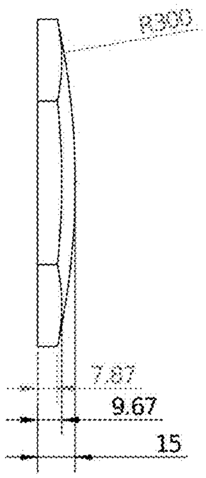
FIG. 20 illustrates a hexagonal implementation for a hexagonal tiling of lens Embodiment A (a) side and (b) top views. Square implementation for a regular, periodic tiling of lens Embodiment A (a) side and (b) top views.
Figure 20B:
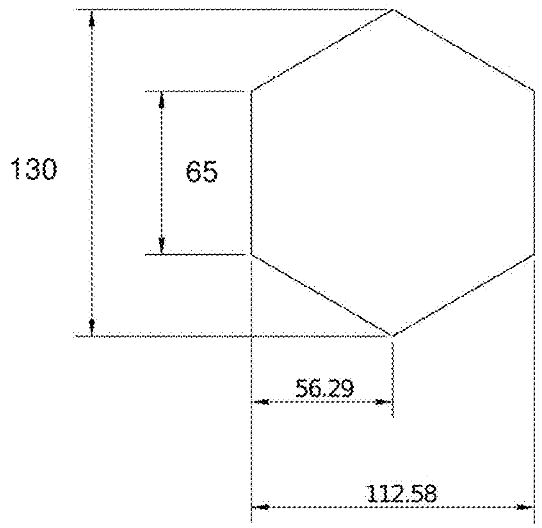
Figure 20C:
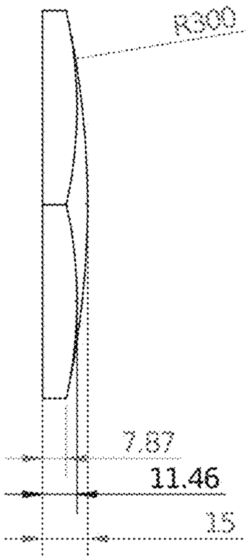
Figure 20D:
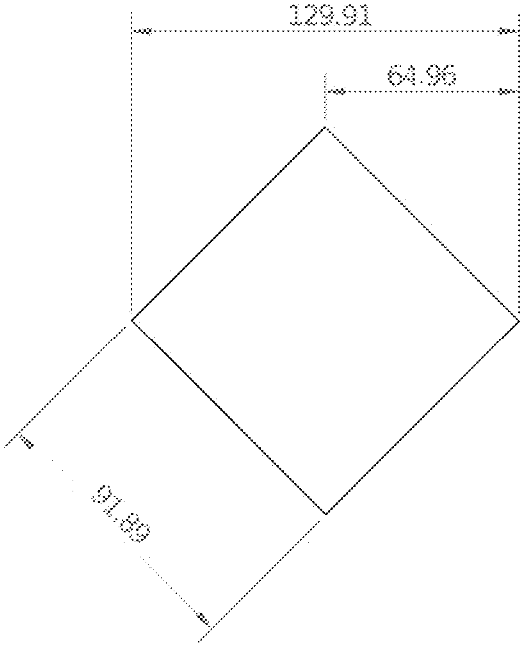

Once the performance goals, geometric and material constraints, feed configuration, and optimization variables have been selected as described above, the optimization process begins as illustrated and described in FIG. 18. The optimizer repeatedly generates new combinations of the 21 optimization variables, which are used to generate a refractive index profile within the user-specified lens geometry. The Ray Tracer then loads the material and geometry data from memory to compute the ray trajectories. The ray trajectories are then transformed into near-field electric-field spatial aperture distributions, the near-field distribution transformed into a far-field angular distribution, which is then used to compute the directivity of the radiation pattern produced by each of the three input feeds. The optimizer will typically require many thousands of evaluations of this design loop until the results converge to reasonable values which are output to the user for evaluation. The optimization loop, since it relies on random number generation to perform the evaluation, is not a deterministic process, and is executed by the user several times to ensure that the best design is located.

After repeatedly running the optimization loop, the individual designs from each optimization run are compared to determine which ones represent the best trade-off between on-axis aperture efficiency and off-axis aperture efficiency. The best result was selected as Embodiment A.

Embodiment A at Ku-band fits within a cylinder with D=13 cm diameter and T=1.5 cm height or "thickness". The back surface of the lens is flat, and the front surface is convex spherical with a radius of curvature of R=30 cm. The lens has an optical back focal length of 5 cm. The dielectric constant within the lens varies from 1.7 to 14.3 (refractive index of 1.3 to 3.8), depending on the exact discretization selected. The dielectric loss tangent within the lens should be as low as possible, preferably below 0.001 but should be lower than 0.005 throughout the 10-14 GHz band. This lens is designed to operate, i.e. have good beam properties for a field of regard defined by $\theta \in [0\text{ deg}, 45\text{ deg}]$ and $\varphi \in [0\text{ deg}, 360\text{ deg}]$.

This lens can be discretized and fabricated in several arrangements, but all implementations of the lens remain fundamentally the same. The lens can be produced with different external outlines, rather than the original circular outlines, while still using the same refractive index distribution. The other shapes can be viewed as a truncated or trimmed version of the circular lens, although they may potentially be manufactured directly as the desired shape in order to reduce costs. Examples are provided in FIG. 20 of the square and hexagonal implementations of the lens, but the design is not limited to these aperture shapes. Non-planar tilings of lens elements may require the outline of the lenses to vary depending on the position of the lens within the tiling.

The continuous refractive index distribution with the 21 scalar coefficients determined by the optimization process is determined by the following polynomial within the lens. The r (radial vector) and z (axial vector) variables from FIG. 4 are evaluated from the back of the lens in millimeters. Different representations of the refractive index distribution, such as a different set of basic functions than powers of the cylindrical variables r and z or a different set of powers, or representation of the refractive index distribution as a numeric data table, do not change the identity of this lens. In addition, perturbations or changes to this profile or the coefficients used to represent the profile produce related designs in the same family as this lens, and so do not represent a fundamentally different lens design from that described here.

$$n(r,z)=1.533383-1.478352\cdot10^{-4}r^2+2.873639\cdot10^{-8}r^4-4.907332\cdot10^{-18}r^6+2.763056\cdot10^{-1}z+2.486028\cdot10^{-2}z^2-3.370549\cdot10^{-3}z^3+3.065626\cdot10^{-5}z^4-1.294440\cdot10^{-4}r^2z+1.239000\cdot10^{-5}r^2z^2-6.454868\cdot10^{-7}r^2z^3+3.639046\cdot10^{-8}r^2z^4+9.551220\cdot10^{-9}r^4z-2.882505\cdot10^{-18}r^6z+2.034582\cdot10^{-10}r^4z^3-3.781935\cdot10^{-12}r^4z^4+5.495423\cdot10^{-18}r^6z-1.384940\cdot10^{-18}r^6z^2+7.639288\cdot10^{-20}r^6z^3+1.865919\cdot10^{-21}r^6z^4$$

The refractive index equation above is the square root of the permittivity distribution within the lens. Describing the refractive index distribution of the lens is equivalent to describing the permittivity or dielectric constant distribution.

Using the polynomial expression above, the lens can be divided into regions of uniform dielectric constant or refractive index based on isocontours of the refractive index distribution. In all cases, a set of lines are drawn across the surface of the lens, where the value of the refractive index or dielectric constant is identical at all points of the line. The area between adjacent lines is defined to have the mean refractive index of the two boundary lines, in these specific examples, but can be chosen differently (e.g. the mean index of the contours, the mean index of the region, the mean dielectric constant of the contours, the mean dielectric constant of the region) without changing the fundamental design or operation of the lens.

Figure 21:
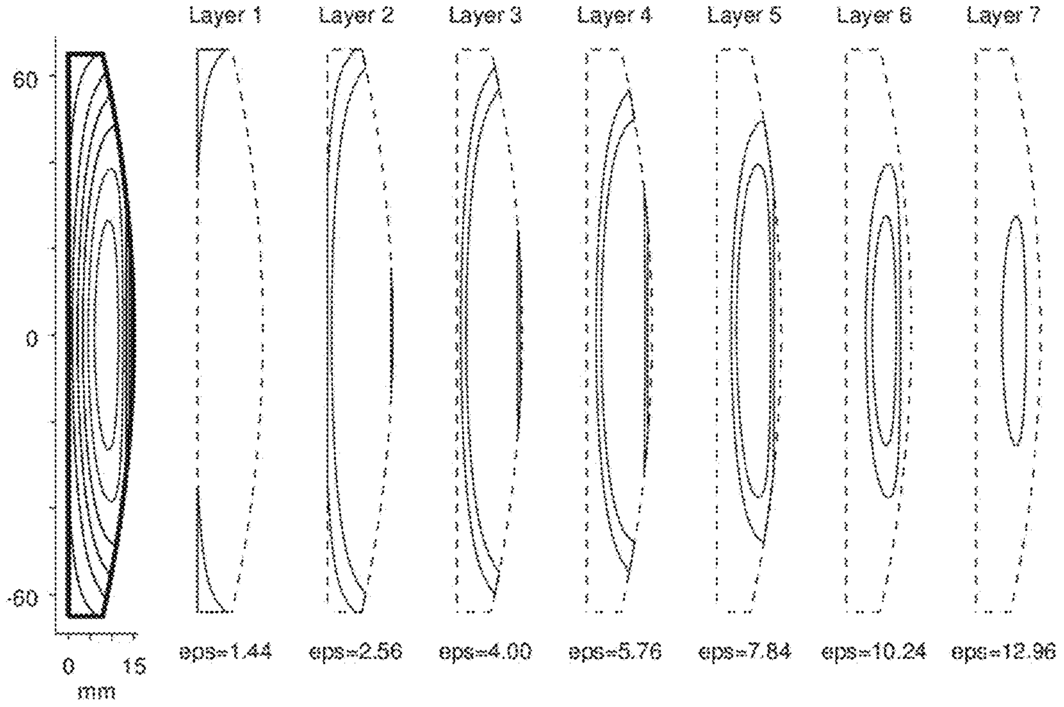
FIG. 21 illustrates discrete lens layers for equal-index isolines with 0.4 separation for Embodiment A.

By assigning the layers within the lens such that the difference in refractive index between isolines is 0.4, then the lens can be constructed from seven discrete materials. In FIG. 21, Layer 1 is the outermost, lowest-index layer, and layer 7 is the innermost, highest-index layer. This discretization of the lens uses dielectric constants from 1.44 to 12.96.

Figure 22:
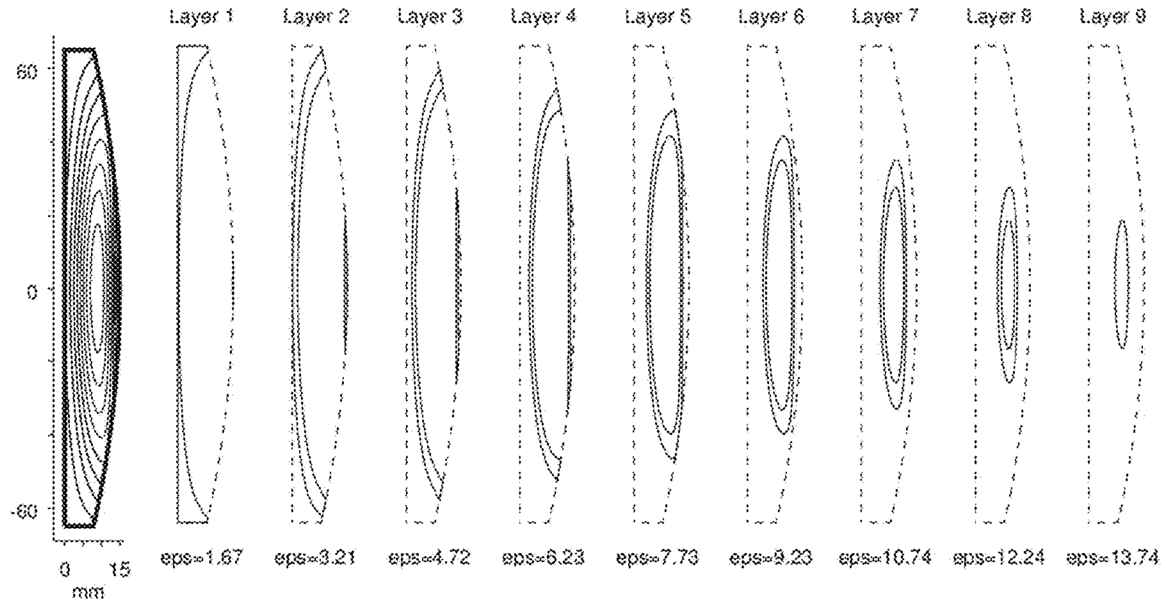
FIG. 22 illustrates discrete lens layers for equal-dielectric constant isolines with 1.5 separation for Embodiment A.
Figure 23:
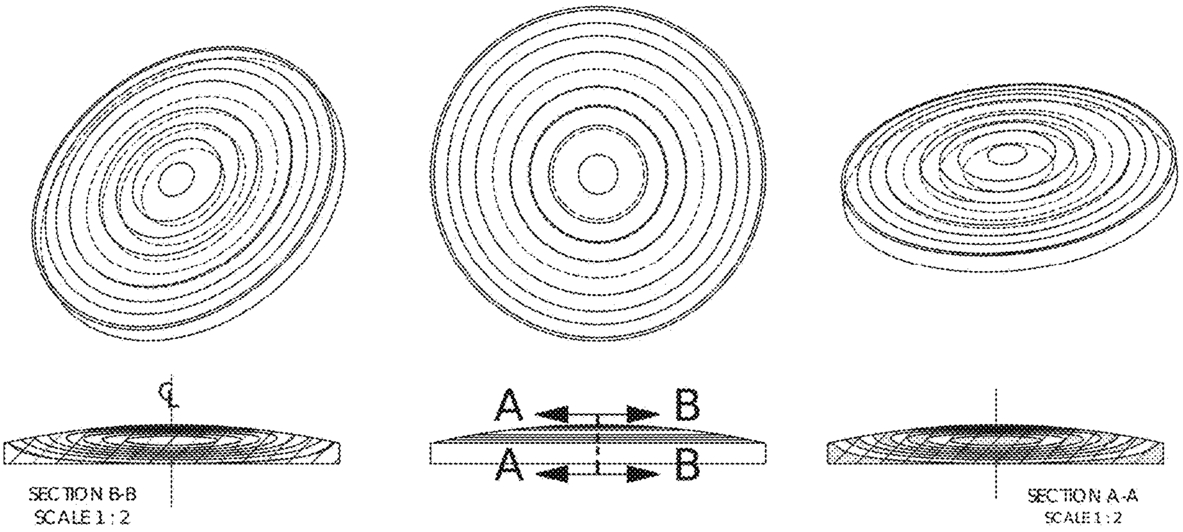
FIG. 23 illustrates perspective, top, and side views of circular implementation for equal-dielectric constant isolines with 1.5 separation for Embodiment A.

Discretizing by dielectric constant rather than refractive index yields more uniform geometric steps between layers, and also samples the innermost, high-index regions with increased resolution. Finer sampling of the inner layers will yield better performance for fewer overall lens layers. By assigning the layers within the lens such that the difference in permittivity between adjacent layers is approximately 1.5, then the lens can be constructed from nine discrete materials. In FIG. 22, Layer 1 is the outermost, lowest-index layer, and layer 9 is the innermost, highest-index layer. This discretization of the lens uses dielectric constants (eps in the diagram below) from 1.67 to 13.74. The structure of the lens is illustrated in FIG. 23.

Figure 24:
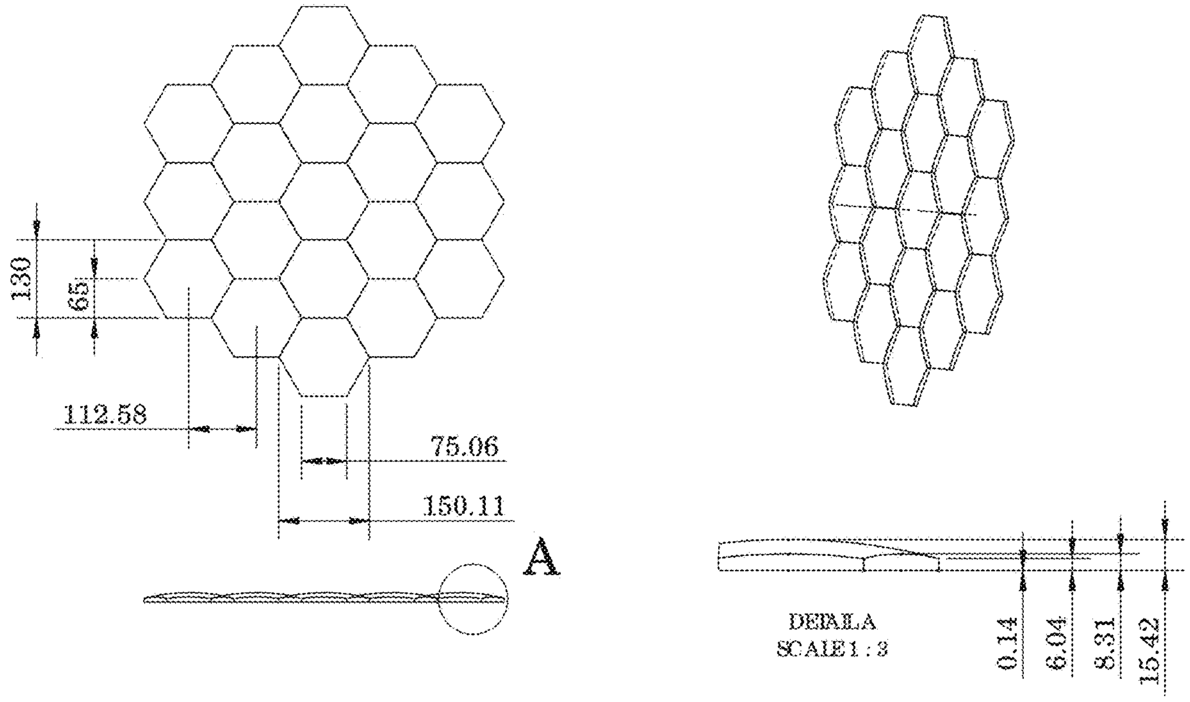
FIG. 24 illustrates perspective, top, and side views of flat hexagonal array of hexagonal lens elements.

The geometric constraints of the design process followed to obtain this lens were set to be convenient for use in an array of lenses. The sides of the cylindrical lens are cut into a hexagonal shape to allow the lenses to be packed in a hexagonal array with flat-flat lens spacing of 13 cm, depicted in FIG. 24. Each of the lenses in the array has independent feeds placed behind the lens, which are independently controlled and phased to allow for scanning the combined beam across the entire field of regard of the individual lenses using the standard principles of phased arrays.

Figure 25:
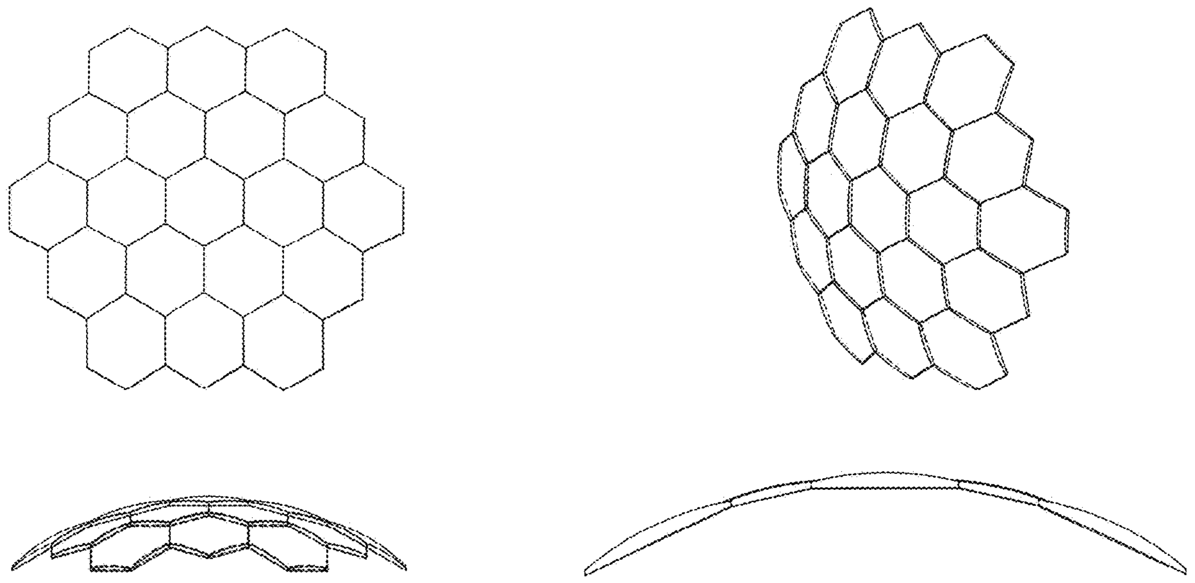
FIG. 25 illustrates perspective, top, and side views of domed hexagonal array of hexagonal lens elements.

The same lens can be combined in a non-planar array, such as that illustrated in FIG. 25, to yield a different scanning performance than that achievable in a flat array. A domed array represents a trade-off between the number of lenses that can target a beam in a particular direction and the field of regard of an individual lens. An appropriate dome size and number of sub-lenses can achieve wider scanning angles than is possible for a flat array of lenses.

Since the lenses are electrically-large, the array factor of the resulting phased array will include grating lobes if the lenses are aligned in a periodic tiling. However, tiling the lenses aperiodically either in the plane of the planar array or as a combination of in-plane and out-of-plane motion in the case of the non-planar array ameliorates the grating lobes and sidelobes to acceptable levels.

Within this specification, the terms "substantially" and "relatively" mean plus or minus 20%, more preferably plus or minus 10%, even more preferably plus or minus 5%, most preferably plus or minus 2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention. Each of the exemplary embodiments described above may be realized separately or in combination with other exemplary embodiments.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A satellite communication terminal, comprising:

a housing;

a plurality of lenses contained within the housing and arranged in a two-dimensional array;

a respective, planar, two-dimensional arrangement of individually controllable feeds for at least three lenses of the plurality of the lenses, wherein each planar, two-dimensional arrangement of individually controllable feeds is in a fixed relation to its respective lens; and control circuitry contained within the housing and coupled to the respective, planar, two-dimensional arrangements of individually controllable feeds for the at least three lenses of the plurality of lenses, the control circuitry configured to simultaneously create a first combined beam from the plurality of lenses and directed at a first satellite by selecting corresponding individual feeds of the respective, planar, two-dimensional arrangements of individually controllable feeds and a second combined beam from the plurality of lenses and directed at a second satellite by selecting corresponding individual feeds of the respective, planar, two-dimensional arrangements of individually controllable feeds, wherein the control circuitry is further configured to control the first combined beam independently of the second combined beam, wherein at least some lenses of the plurality of lenses have geometric centers that differ from their phase centers.

2. The satellite communication terminal of claim 1, wherein each of the respective, planar, two-dimensional arrangements of individually controllable feeds is disposed on a substantially flat printed circuit board.

3. The satellite communication terminal of claim 1, wherein the housing comprises a substantially planar or slightly curved top surface adjacent the plurality of lenses.

4. The satellite communication terminal of claim 3, wherein the top surface of the housing is substantially planar.

5. The satellite communication terminal of claim 1, wherein each lens of the plurality of lenses has a geometric center that differs from its phase center.

6. The satellite communication terminal of claim 1, wherein phase centers of the plurality of lenses define a random arrangement.

7. The satellite communication terminal of claim 1, wherein phase centers of the plurality of lenses define a non-uniform arrangement.

8. The satellite communication terminal of claim 1, wherein the control circuitry is configured to not activate at least some feeds of each respective, planar, two-dimensional arrangement of individually controllable feeds when creating the first combined beam and the second combined beam.

9. The satellite communication terminal of claim 8, wherein the at least some feeds not activated are positioned between activated feeds.

10. The satellite communication terminal of claim 1, wherein the control circuitry is configured to create the first combined beam with a wavelength that is less than half a dimension of each of the at least three lenses.

11. The satellite communication terminal of claim 1, wherein at least some feeds of the respective, planar, two-dimensional arrangements of individually controllable feeds are offset from a focal point of their respective lens.

12. A satellite communication terminal configured to produce or receive multiple beams simultaneously, comprising:

a housing;

a two-dimensional array of plano-convex lenses disposed within the housing;

a feed array comprising multiple feed clusters, wherein each feed cluster contains individually addressable feeds arranged across two dimensions underneath and in fixed relation to a respective plano-convex lens of the two-dimensional array of plano-convex lenses, wherein the feed clusters occupy a smaller footprint than the respective plano-convex lens; and control circuitry disposed within the housing and coupled to the feed array and configured to individually address the individually addressable feeds of the feed clusters to coherently operate correspondingly positioned feed elements in the multiple feed clusters arranged underneath the respective plano-convex lenses, wherein at least some lenses of the two-dimensional array of plano-convex lenses have geometric centers that differ from their phase centers.

13. The satellite communication terminal of claim 12, wherein each of the feed clusters is disposed on a substantially flat printed circuit board arranged substantially parallel to a flat surface of the respective plano-convex lens.

14. The satellite communication terminal of claim 12, wherein the housing comprises a substantially planar or slightly curved top surface adjacent the two-dimensional array of plano-convex lenses.

15. The satellite communication terminal of claim 14, wherein the top surface of the housing is substantially planar.

16. The satellite communication terminal of claim 12, wherein phase centers of the plano-convex lenses define a random arrangement.

17. The satellite communication terminal of claim 12, wherein phase centers of the plano-convex lenses define a non-uniform arrangement.

18. The satellite communication terminal of claim 12, wherein the control circuitry is configured to create a first combined beam from correspondingly positioned feed elements in the multiple feed clusters with a wavelength that is less than half a dimension of each of the plano-convex lenses.

19. The satellite communication terminal of claim 12, wherein at least some feeds of the multiple feed clusters are offset from a focal point of their respective plano-convex lens.

* * * * *